United States Patent
Herzog et al.

(10) Patent No.: US 10,671,039 B2
(45) Date of Patent: Jun. 2, 2020

(54) COMPUTER SYSTEM AND METHOD FOR PREDICTING AN ABNORMAL EVENT AT A WIND TURBINE IN A CLUSTER

(71) Applicant: Uptake Technologies, Inc., Chicago, IL (US)

(72) Inventors: James Herzog, Downers Grove, IL (US); Benedict Augustine, Arlington Heights, IL (US)

(73) Assignee: Uptake Technologies, Inc., Chicago, IL (US)

( * ) Notice: Subject to any disclaimer, the term of this patent is extended or adjusted under 35 U.S.C. 154(b) by 325 days.

(21) Appl. No.: 15/585,940

(22) Filed: May 3, 2017

(65) Prior Publication Data

US 2018/0320658 A1 Nov. 8, 2018

(51) Int. Cl.
*G05B 19/042* (2006.01)
*F03D 7/04* (2006.01)
(Continued)

(52) U.S. Cl.
CPC ......... *G05B 19/0426* (2013.01); *F03D 7/045* (2013.01); *F03D 7/048* (2013.01);
(Continued)

(58) Field of Classification Search
CPC .............. G05B 19/0426; G05B 23/024; G05B 2219/2619; F03D 7/045; F03D 7/048; F03D 17/00; F05B 2270/404
(Continued)

(56) References Cited

U.S. PATENT DOCUMENTS

| 5,566,092 A | 10/1996 | Wang et al. |
| 5,633,800 A | 5/1997 | Bankert et al. |

(Continued)

FOREIGN PATENT DOCUMENTS

| GB | 2405492 A | * | 2/2005 | ............. F03D 7/045 |
| KR | 20160073945 A | * | 6/2016 | ............. G06Q 50/06 |

(Continued)

OTHER PUBLICATIONS

Z. Daneshi-Far et. al., Review of Failures and Condition Monitoring in Wind Turbine Generators, XIX International Conference on Electrical Machines—ICEM 2010, Rome, 1-6. (Year: 2010).*

(Continued)

*Primary Examiner* — Rehana Perveen
*Assistant Examiner* — Justin C Mikowski
(74) *Attorney, Agent, or Firm* — Lee Sullivan Shea & Smith LLP

(57) ABSTRACT

The example systems, methods, and devices disclosed herein generally relate to performing predictive analytics on behalf of wind turbines. In some instances, a data-analytics platform defines and executes a predictive model for a specific wind turbine. The predictive model may be defined and executed based on operating data for the specific wind turbine and for other wind turbines that experience similar environmental conditions as the specific wind turbine and that are operating in an expected operational state. In response to executing the predictive model, the data-analytics platform may cause an action to occur at the specific wind turbine or cause a user interface to display a representation of the output of the executed model, among other possibilities.

16 Claims, 10 Drawing Sheets

(51) Int. Cl.
*G05B 23/02* (2006.01)
*F03D 17/00* (2016.01)

(52) U.S. Cl.
CPC ............ *G05B 23/024* (2013.01); *F03D 17/00* (2016.05); *F05B 2270/404* (2013.01); *G05B 2219/2619* (2013.01)

(58) Field of Classification Search
USPC .......................................................... 703/2
See application file for complete search history.

(56) References Cited

U.S. PATENT DOCUMENTS

| | | | |
|---|---|---|---|
| 6,256,594 B1 | 7/2001 | Yamamoto et al. | |
| 6,336,065 B1 | 1/2002 | Gibson et al. | |
| 6,442,542 B1 | 8/2002 | Ramani et al. | |
| 6,473,659 B1 | 10/2002 | Shah et al. | |
| 6,622,264 B1 | 9/2003 | Bliley et al. | |
| 6,634,000 B1 | 10/2003 | Jammu et al. | |
| 6,643,600 B2 | 11/2003 | Yanosik et al. | |
| 6,650,949 B1 | 11/2003 | Fera et al. | |
| 6,725,398 B1 | 4/2004 | Varma et al. | |
| 6,760,631 B1 | 7/2004 | Berkowitz et al. | |
| 6,775,641 B2 | 8/2004 | Wegerich et al. | |
| 6,799,154 B1 | 9/2004 | Aragones et al. | |
| 6,823,253 B2 | 11/2004 | Brunell | |
| 6,859,739 B2 | 2/2005 | Wegerich et al. | |
| 6,892,163 B1 | 5/2005 | Herzog et al. | |
| 6,947,797 B2 | 9/2005 | Dean et al. | |
| 6,952,662 B2 | 10/2005 | Wegerich et al. | |
| 6,957,172 B2 | 10/2005 | Wegerich | |
| 6,975,962 B2 | 12/2005 | Wegerich et al. | |
| 7,020,595 B1 | 3/2006 | Adibhatla et al. | |
| 7,082,379 B1 | 7/2006 | Bickford et al. | |
| 7,100,084 B2 | 8/2006 | Unkle et al. | |
| 7,107,491 B2 | 9/2006 | Graichen et al. | |
| 7,127,371 B2 | 10/2006 | Duckert et al. | |
| 7,233,886 B2 | 6/2007 | Wegerich et al. | |
| 7,280,941 B2 | 10/2007 | Bonanni et al. | |
| 7,308,385 B2 | 12/2007 | Wegerich et al. | |
| 7,373,283 B2 | 5/2008 | Herzog et al. | |
| 7,403,869 B2 | 7/2008 | Wegerich et al. | |
| 7,409,320 B2 | 8/2008 | Wegerich | |
| 7,415,382 B1 | 8/2008 | Bickford et al. | |
| 7,428,478 B2 | 9/2008 | Aragones | |
| 7,447,666 B2 | 11/2008 | Wang | |
| 7,457,693 B2 | 11/2008 | Olsen et al. | |
| 7,457,732 B2 | 11/2008 | Aragones et al. | |
| 7,509,235 B2 | 3/2009 | Bonissone et al. | |
| 7,536,364 B2 | 5/2009 | Subbu et al. | |
| 7,539,597 B2 | 5/2009 | Wegerich et al. | |
| 7,548,830 B2 | 6/2009 | Goebel et al. | |
| 7,634,384 B2 | 12/2009 | Eryurek et al. | |
| 7,640,145 B2 | 12/2009 | Wegerich et al. | |
| 7,660,705 B1 | 2/2010 | Meek et al. | |
| 7,725,293 B2 | 5/2010 | Bonissone et al. | |
| 7,739,096 B2 | 6/2010 | Wegerich et al. | |
| 7,756,678 B2 | 7/2010 | Bonissone et al. | |
| 7,822,578 B2 | 10/2010 | Kasztenny et al. | |
| 7,869,908 B2 | 1/2011 | Walker | |
| 7,919,940 B2 | 4/2011 | Miller et al. | |
| 7,941,701 B2 | 5/2011 | Wegerich et al. | |
| 7,962,240 B2 | 6/2011 | Morrison et al. | |
| 8,024,069 B2 | 9/2011 | Miller et al. | |
| 8,050,800 B2 | 11/2011 | Miller et al. | |
| 8,145,578 B2 | 3/2012 | Pershing et al. | |
| 8,229,769 B1 | 7/2012 | Hopkins | |
| 8,234,420 B2 | 7/2012 | Lueckenbach et al. | |
| 8,239,170 B2 | 8/2012 | Wegerich | |
| 8,275,577 B2 | 9/2012 | Herzog | |
| 8,285,402 B2 | 10/2012 | Lueckenbach et al. | |
| 8,311,774 B2 | 11/2012 | Hines | |
| 8,321,194 B2 * | 11/2012 | Meagher ............... | H02J 13/001 700/286 |
| 8,352,216 B2 | 1/2013 | Subbu et al. | |
| 8,532,795 B2 | 9/2013 | Adavi et al. | |
| 8,533,018 B2 | 9/2013 | Miwa et al. | |
| 8,560,494 B1 | 10/2013 | Downing et al. | |
| 8,606,418 B1 * | 12/2013 | Myers ..................... | F03D 7/046 700/287 |
| 8,620,618 B2 | 12/2013 | Eryurek et al. | |
| 8,620,853 B2 | 12/2013 | Herzog | |
| 8,626,385 B2 | 1/2014 | Humphrey | |
| 8,645,276 B2 | 2/2014 | Wong et al. | |
| 8,660,980 B2 | 2/2014 | Herzog | |
| 8,689,108 B1 | 4/2014 | Duffield et al. | |
| 8,713,467 B1 | 4/2014 | Goldenberg et al. | |
| 8,786,605 B1 | 7/2014 | Curtis et al. | |
| 8,799,799 B1 | 8/2014 | Cervelli et al. | |
| 8,812,960 B1 | 8/2014 | Sun et al. | |
| 8,832,594 B1 | 9/2014 | Thompson et al. | |
| 8,850,000 B2 | 9/2014 | Collins et al. | |
| 8,862,938 B2 | 10/2014 | Souvannarath | |
| 8,868,537 B1 | 10/2014 | Colgrove et al. | |
| 8,886,601 B1 | 11/2014 | Landau et al. | |
| 8,909,656 B2 | 12/2014 | Kumar et al. | |
| 8,917,274 B2 | 12/2014 | Ma et al. | |
| 8,918,246 B2 | 12/2014 | Friend | |
| 8,924,429 B1 | 12/2014 | Fisher et al. | |
| 8,935,201 B1 | 1/2015 | Fisher et al. | |
| 8,937,619 B2 | 1/2015 | Sharma et al. | |
| 8,938,686 B1 | 1/2015 | Erenrich et al. | |
| 10,180,997 B2 * | 1/2019 | Kim ....................... | F03D 7/048 |
| 2002/0091972 A1 | 7/2002 | Harris et al. | |
| 2002/0152056 A1 | 10/2002 | Herzog et al. | |
| 2003/0055666 A1 | 3/2003 | Roddy et al. | |
| 2003/0126258 A1 | 7/2003 | Conkright et al. | |
| 2004/0181712 A1 | 9/2004 | Taniguchi et al. | |
| 2004/0230377 A1 * | 11/2004 | Ghosh ................... | F03D 7/0284 702/3 |
| 2004/0243636 A1 | 12/2004 | Hasiewicz et al. | |
| 2005/0119905 A1 | 6/2005 | Wong et al. | |
| 2005/0222747 A1 | 10/2005 | Vhora et al. | |
| 2007/0263628 A1 | 11/2007 | Axelsson et al. | |
| 2008/0059080 A1 | 3/2008 | Greiner et al. | |
| 2008/0059120 A1 | 3/2008 | Kiao et al. | |
| 2009/0326890 A1 | 12/2009 | Shetty et al. | |
| 2010/0274400 A1 * | 10/2010 | Ormel .................... | F03D 7/043 700/287 |
| 2011/0020122 A1 * | 1/2011 | Parthasarathy ......... | F03D 17/00 416/61 |
| 2011/0101691 A1 | 5/2011 | Hashimoto et al. | |
| 2011/0313726 A1 | 12/2011 | Parthasarathy et al. | |
| 2012/0041575 A1 | 2/2012 | Maeda et al. | |
| 2012/0053984 A1 * | 3/2012 | Mannar ............... | G06Q 10/0635 705/7.28 |
| 2012/0185180 A1 * | 7/2012 | Frederiksen ............ | F03D 17/00 702/35 |
| 2012/0209539 A1 * | 8/2012 | Kim .................... | G05B 23/0221 702/41 |
| 2012/0271612 A1 | 10/2012 | Barsoum et al. | |
| 2012/0310597 A1 | 12/2012 | Uchiyama et al. | |
| 2013/0010610 A1 | 1/2013 | Karthikeyan et al. | |
| 2013/0024416 A1 | 1/2013 | Herzog | |
| 2013/0283773 A1 | 10/2013 | Hague | |
| 2013/0325502 A1 | 12/2013 | Robicsek et al. | |
| 2014/0012886 A1 | 1/2014 | Downing et al. | |
| 2014/0032132 A1 | 1/2014 | Stratton et al. | |
| 2014/0060030 A1 | 3/2014 | Ma et al. | |
| 2014/0089035 A1 | 3/2014 | Jericho et al. | |
| 2014/0105481 A1 | 4/2014 | Hasselbusch et al. | |
| 2014/0121868 A1 | 5/2014 | Zhang et al. | |
| 2014/0169398 A1 | 6/2014 | Arndt et al. | |
| 2014/0170617 A1 | 6/2014 | Johnson et al. | |
| 2014/0184643 A1 | 7/2014 | Friend | |
| 2014/0222355 A1 | 8/2014 | Cheim et al. | |
| 2014/0324495 A1 * | 10/2014 | Zhou ..................... | F03D 80/50 705/7.13 |
| 2014/0330600 A1 | 11/2014 | Candas et al. | |
| 2014/0330749 A1 | 11/2014 | Candas et al. | |
| 2014/0351642 A1 | 11/2014 | Bates et al. | |
| 2014/0357295 A1 | 12/2014 | Skomra et al. | |
| 2014/0358601 A1 | 12/2014 | Smiley et al. | |

(56) References Cited

U.S. PATENT DOCUMENTS

| | | | |
|---|---|---|---|
| 2014/0365187 A1* | 12/2014 | Guzman | F03D 17/00 703/2 |
| 2015/0046870 A1 | 2/2015 | Goldenberg et al. | |
| 2015/0085297 A1 | 3/2015 | Hughes et al. | |
| 2015/0184549 A1 | 7/2015 | Pamujula et al. | |
| 2015/0220670 A1 | 8/2015 | Linehan et al. | |
| 2015/0262060 A1 | 9/2015 | Husain et al. | |
| 2015/0345476 A1* | 12/2015 | Gregg | F03D 7/048 702/92 |
| 2016/0034856 A1* | 2/2016 | Son | G06Q 10/20 705/7.18 |
| 2016/0115942 A1 | 4/2016 | Noto et al. | |
| 2016/0169205 A1* | 6/2016 | Wang | F03D 7/028 703/2 |
| 2016/0371599 A1 | 12/2016 | Nicholas et al. | |
| 2017/0335827 A1* | 11/2017 | Wilson | F03D 7/048 |
| 2018/0010576 A1 | 1/2018 | Brake et al. | |
| 2018/0058425 A1 | 3/2018 | Deshpande et al. | |

FOREIGN PATENT DOCUMENTS

| | | |
|---|---|---|
| WO | 2011117570 | 9/2011 |
| WO | 2011143531 | 11/2011 |
| WO | 2013034420 | 3/2013 |
| WO | 2014145977 | 9/2014 |
| WO | 2014205497 | 12/2014 |
| WO | 2015081245 A1 | 6/2015 |
| WO | 2017194067 A1 | 11/2017 |

OTHER PUBLICATIONS

Jan Helsen et. al., Long-Term Monitoring of Wind Farms Using Big Data Approach, 2016 IEEE Second International Conference on Big Data Computing Service and Applications, 265-268. (Year: 2016).*

Can Huang et. al., Maximum Power Point Tracking Strategy for Large-Scale Wind Generation Systems Considering Wind Turbine Dynamics, IEEE Transactions on Industrial Electronics, vol. 62, No. 4, Apr. 2015, 2530-2539. (Year: 2015).*

Muhammad Khalid and Andrey V. Savkin, a Method for Short-Term Wind Power Prediction With Multiple Observation Points, IEEE Transactions on Power Systems, vol. 27, No. 2, May 2012, 579-586. (Year: 2012).*

Liu et al. "A Dynamic Clustering Model of Wind Farm Based on the Operation Data" AIP Journal of Renewable and Sustainable Energy vol. 7, No. 043111, dx.doi.org/10.1063/1.4926906, 2015, 10 pages.

Biswas, "Redundancy-based Approaches in Wireless Multihop Network Design", PhD Dissertation Submitted to Graduate Faculty of North Carolina State University (2014).

Isermann, "Model-based Fault Detection and Diagnosis—Status and Applications", Institute of Automatic Control, Darmstadt University of Technology (2004).

Narasimhan et al, "Combining Model-Based and Feature-Driven Diagnosis Approaches—A Case Study on Electromechanical Actuators", 21st International Workshop on Principles of Diagnosis (2010).

Prentzas et al, Categorizing Approaches Combining Rule-Based and Case-Based Reasoning.

Infor M3 Enterprise Management System, Infor.com (2014).

Infor Equipment, Infor.com (2012).

Infor Introduces Next-Generation Solution for Equipment Dealers and Service Providers, Infor.com (Feb. 20, 2014).

Infor Equipment for Rental, Infor.com (2013).

Waltermire et al, Applying the Continuous Monitoring Technical Reference Model to the Asset, Configuration, and Vulnerability Management Domains (DRAFT), NIST (Jan 2012).

Parthasarathy et al. "Use if SCADA Data for Failure Detection in Wind Turbines" Proceedings f 2011 Energy Sustainability Conference and Fuel Cell Conference, Washington, D.C. Aug. 7-10, 2011, 12 pages.

Uluyol et al. "Mult-Turbine Associative Model for Wind Turbine Performance Monitoring." Annual Conference of the Prognostics and Health Management Society 2012, 10 pages.

Lee et al. "Smart Reconfigurable Prognostics Platform for Integrated Wind Turbine & Wind Farm Performance Monitoring and Maintenance." www.imscenter.net/windturbinephm/wind-turbine-phm-poster, Jan. 13, 2017 (accessed via WayBack Machine at web.archive.org/web/20170113081103/http://www.imscenter.net/windturbinephm/wind-turbine-phm-poster), 1 page.

International Searching Authority International Search Report and Written Opinion dated Aug. 18, 2018, issued in connection with International Application No. PCT/US2018/030707, filed May 2, 2018, 11 pages.

* cited by examiner

COMPUTER SYSTEM AND METHOD FOR PREDICTING AN ABNORMAL EVENT AT A WIND TURBINE IN A CLUSTER

BACKGROUND

In recent years, there has been a focus on utilizing renewable energy sources to help reduce reliance on fossil fuels. One example renewable energy source is a wind turbine that converts wind's kinetic energy into electricity. Broadly speaking, a wind turbine is an asset that utilizes multiple subsystems to help accomplish this conversion. Typically, a wind site (also known as a "wind farm"), which includes numerous wind turbines, is arranged at a geographical location that experiences windy conditions and provides electricity to an existing power grid.

Because of the increasing reliance on wind turbines to generate renewable energy, it is also becoming increasingly desirable to monitor and analyze wind turbines in operation. To facilitate this, some have developed mechanisms to monitor wind-turbine attributes and detect abnormalities at a wind turbine.

OVERVIEW

Generally, a wind site is distributed across a geographical area that is large enough that environmental conditions may vary across the area. For example, some portion of the geographical area may experience a wind pattern, wind speed, temperature, humidity, etc. that differs from other portions of the geographical area. Moreover, these environmental conditions may vary from one point in time to another such that the environmental conditions experienced at the same portion of the geographical area may change over time. Accordingly, some wind turbines of a wind site might experience one or more environmental conditions in a different manner than other wind turbines of the wind site, which may result in some wind turbines degrading faster or slower than other wind turbines.

Disclosed herein are improved systems, devices, and methods for analyzing the operation of a particular wind turbine as it relates to one or more other wind turbines that have experienced similar environmental conditions to the particular wind turbine, and then based on such analysis, making predictions regarding the operation of the particular wind turbine, which may help monitor and preemptively repair and/or maintain wind turbines that may be degrading in different manners.

One approach for monitoring wind turbines generally involves various sensors distributed throughout a wind turbine that monitor the operating conditions of the wind turbine and provide signals reflecting the wind-turbine's operation to a local computer. The local computer may be configured to send data reflecting attributes of the wind turbine, including operating data (e.g., sensor signal data) and/or meteorological data indicative of the wind turbine's surrounding environmental conditions, to another location for further analysis, such as a control center of a wind site or perhaps a data-analytics platform that specializes in monitoring the operation of wind turbines.

For instance, an organization that is interested in monitoring and analyzing wind turbines in operation may deploy a data-analytics platform that is configured to receive and analyze various types of wind-turbine-related data. For example, the data-analytics platform may be configured to receive and analyze data indicating wind-turbine attributes, such as wind-turbine identifiers, operating data, meteorological data, electricity-production data, wind-turbine configuration data, etc. As another example, the data-analytics platform may be configured to receive and analyze wind-turbine maintenance data, such as data regarding inspections, servicing, and/or repairs. As yet another example, the data-analytics platform may be configured to receive and analyze external data that relates to wind-turbine operation, such as weather or other environmental data. The data-analytics platform may be configured to receive and analyze various other types of wind-turbine-related data as well.

Further, the data-analytics platform may receive this wind-turbine-related data from various different sources. As one example, the data-analytics platform may receive wind-turbine-related data from the wind turbines themselves. As another example, the data-analytics platform may receive wind-turbine-related data from another computer system at a wind site (e.g., a control center). As yet another example, the data-analytics platform may receive wind-turbine-related data from some other platform or system (e.g., an organization's existing platform) that previously received and/or generated wind-turbine-related data. As still another example, the data-analytics platform may receive wind-turbine-related data from an external data source, such as a wind-turbine maintenance data repository and/or a weather data provider (e.g., a meteorological ("met") tower installed at the wind site or the National Weather Service) for instance. The data-analytics platform may receive wind-turbine-related data from various other sources as well.

According to example embodiments disclosed herein, the data-analytics platform may be configured to utilize wind-turbine-related data to define, and later execute, a predictive model that is specific to a particular wind turbine and the operation thereof. The predictive model may generally represent a relationship between (1) operating data for the particular wind turbine as it relates to operating data for wind turbines that experience similar environmental conditions and (2) a likelihood that the particular wind turbine is either presently experiencing an abnormal event (e.g., an anomaly) or will experience an abnormal event within a certain amount of time in the future (e.g., a failure). The process for defining and executing such a predictive model may generally comprise two phases, referred to herein as a "training" phase and a "run-time" phase, respectively.

During an example training phase, the data-analytics platform may begin by identifying a particular wind turbine at a wind site (i.e., the "target turbine") for which the predictive model is being defined as well as a period of time from the past (i.e., the "timeframe of interest") from which historical turbine operating behavior is used to define the model.

Next, the data-analytics platform may analyze the environmental conditions experienced by the target turbine at each of various different times during the timeframe of interest as compared to the environmental conditions experienced by other wind turbines at the wind site at those same times, in order to identify which other wind turbine(s) at the wind site experienced similar environment conditions to the target turbine at each of the various points in time during the timeframe of interest. In this disclosure, a set of wind turbines that experience similar environment conditions at a given point in time may be referred to as a "cluster," and each wind turbine in a given cluster at a given point in time may be referred to as a "member" of that given cluster.

As discussed before, the environmental conditions experienced by each turbine at a wind site typically will vary over the course of time. Thus, as a result of its analysis, the data-analytics platform may determine that the other members of the target turbine's cluster vary during the timeframe of interest. For instance, at a first time, the target turbine may be a member of a cluster that includes an initial set of other wind turbine(s) at the wind site that are experiencing similar environmental conditions to the target turbine at the first time. If the environmental conditions do not meaningfully change between the first time and a second time, the target turbine's cluster may then remain the same between the first and second times (i.e., the cluster at the second point in time still includes the target turbine and the initial set of other wind turbine(s) that were included in the cluster at the first time). However, if environmental conditions then change from the second time to a third time, the wind turbines at the wind site that are experiencing similar environmental conditions to the target turbine may change, and thus the target turbine's cluster may change such that it includes a different set of other wind turbine(s) at the wind site that are experiencing similar environmental conditions to the target turbine at the third time (which may be entirely different than the initial set of other wind turbine(s) or may overlap partially with the initial set). In this respect, the target turbine's cluster typically varies over the course of time (i.e., it is time varying).

The data-analytics platform may determine whether wind turbines are experiencing similar enough environmental conditions to be identified as members of the same cluster in a variety of manners. In example embodiments, the data-analytics platform may perform this determination based at least on (a) historical environmental data providing a measure of one or more environmental conditions experienced by the target turbine during the timeframe of interest and (b) historical environmental data providing a measure of the same one or more environmental conditions experienced by other turbines from the wind site.

More specifically, the data-analytics platform may first identify historical environmental data providing a measure of at least one environmental condition (e.g., wind direction, wind speed, etc.) that the target turbine experienced during the timeframe of interest. The data-analytics platform may then identify historical data providing a measure of the same environmental condition for some or all of the other wind turbines that make up the wind site during the same timeframe. Thereafter, the data-analytics platform may compare the historical environmental data of the target turbine and the historical environmental data of the other wind turbines at various different times during the timeframe of interest to determine whether the wind turbines' respective measurements of the at least one environmental condition are sufficiently similar. The data-analytics platform may make this determination using any approach now known or later developed for assessing similarity between measurements of an environmental condition.

In one possible implementation, the data-analytics platform may simply assess whether the difference between the wind turbines' respective measurements for each environmental condition of interest falls below a corresponding threshold. For example, the data-analytics platform may calculate a speed difference between the respective wind speeds measured by wind turbines at each of various different times during the timeframe of interest and then determine whether that speed difference falls below a speed threshold. As another example, the data-analytics platform may calculate a directional difference (e.g., in degrees clockwise from due north) between the respective wind directions measured by wind turbines at each of various different times during the timeframe of interest and then determine whether that directional difference falls below a directional threshold. Many other examples are possible as well.

In another implementation, the data-analytics platform may take the wind turbines' respective measurements for a plurality of different environmental conditions at each of various different times during the timeframe of interest and input them into a process that determines and outputs a "similarity score" between the wind turbines' respective measurements. As one possible example, such a process may calculate the difference between the wind turbines' respective measurements for each of a plurality of different environmental conditions and then analyze this set of differences collectively to determine the level of similarity between wind turbines' respective measurements. Other examples are possible as well.

Moreover, in some example embodiments, the data-analytics platform may identify the time-varying cluster that the target turbine was a member of during the timeframe of interest based on other types of data in addition to historical environmental data, such as location data for the target turbine and other turbines that are from the wind site. For instance, based on the target turbine's location, the data-analytics platform may identify one or more other turbines that are likely experiencing similar environmental conditions as the target turbine based on proximity to the target turbine. After this initial filter, the data-analytics platform may then analyze the historical environmental data for the one or more other turbines that are proximate to the target turbine in line with the above discussion.

In any event, after identifying the target turbine's cluster, the data-analytics platform may identify any cluster members that were "active" during the timeframe of interest. More specifically, the data-analytics platform may identify any turbines that were "active" at the points in time when they were considered to be members of the target turbine's cluster. At any given time during the timeframe of interest, the active members in the target turbine's cluster (other than the target turbine itself) at that time may be collectively viewed as a single, aggregated turbine (i.e., a "virtual turbine"). Thus, as with the target turbine's cluster, the virtual turbine that is representative of the other active turbines in the target turbine's cluster varies over time.

Generally, a wind turbine is considered to be "active" when it is functioning at a normal (i.e., expected) operational state. For example, when a wind turbine is generating an expected amount of electricity, then that wind turbine may be considered to be "active." On the other hand, when a wind turbine is, for instance, inoperable (e.g., under repair or deactivated for some other reason) or operable but generating an unexpected amount of electricity, then that wind turbine may not be considered to be "active" but rather "inactive." It should be understood that any given turbine might vary over the timeframe of interest between being "active" or "inactive."

This step may be useful because it may be the case that not all members of the target turbine's cluster are operating as expected. For example, even though a turbine might be experiencing the same environmental conditions as the target turbine, it may nonetheless be inoperable or operating unexpectedly. For instance, a meteorological unit of a wind turbine in the target turbine's cluster may generate environmental data that is ultimately provided to the data-analytics platform but that wind turbine might nonetheless not be operational because, for example, it might be under repair or deactivated due to certain environmental conditions making it unsafe for that wind turbine to operate. Accordingly, the data-analytics platform may identify active members in a target turbine's cluster in order to define a baseline for normal operation of a wind turbine that is a member of the target turbine's cluster (which may vary over the timeframe of interest as described above). A virtual turbine may represent this baseline of normal operation.

The data-analytics platform may identify active members in a target turbine's cluster in a number of manners. In some example embodiments, this operation may involve determining whether a wind turbine was operable or inoperable at a given point in time, which may be based on historical wind-turbine related data. Examples of this data may include historical electricity-production data and/or wind-turbine maintenance data, among other examples. In particular, electricity-production data may indicate that a certain turbine was generating electricity, from which the data-analytics platform might infer that the turbine was active. On the other hand, electricity-production data may indicate that the turbine was not generating electricity, from which the data-analytics platform might infer that the turbine was not active. Similarly, wind-turbine maintenance data may indicate that a wind turbine was under repair, from which the data-analytics platform might infer that the turbine was not active. In addition, the control unit of the wind turbine may generate a message (e.g., an event code) that indicates that the wind turbine has become inactive at a specified point in time. Other examples of data may additionally or alternatively be used.

In example embodiments, the data-analytics platform may additionally or alternatively identify active cluster members by determining whether a wind turbine was operating as expected or unexpectedly, as opposed to merely operating versus not operating. In some cases, this determination may be based in part on an observed power-curve that provides a range of expected electricity production as a function of wind speed. More specifically, the data-analytics platform may obtain, for each cluster member, historical electricity-production data and corresponding historical wind-speed data for the time or times when the turbine was a member of the target turbine's cluster. Thereafter, for each instance of such data, the data-analytics platform may then determine whether the turbine's electricity production at that wind speed falls within the expected range of electricity production as defined by the observed power-curve. If so, the data-analytics platform may infer that that turbine was operating as expected and designate it as an active cluster member. Otherwise, the data-analytics platform may infer that that turbine was operating unexpectedly and designate it as an inactive cluster member. Once the data-analytics platform has determined all of the active cluster members, it then can use those turbines as a baseline for normal turbine operation.

For each other turbine that qualifies as an active member of the target turbine's cluster during at least a portion of the timeframe of interest, the data-analytics platform may obtain historical operating data of the turbine for at least the times during the timeframe of interest at which that turbine was an active member. For example, the data-analytics platform may obtain historical operating data for each active member of the target turbine's cluster for a certain amount of time (or a certain amount of data) around the time or times that the given turbine was active and a member of the target turbine's cluster. Alternatively, for each other turbine that qualifies as an active member of the target turbine's cluster during at least a portion of the timeframe of interest, the data-analytics platform may obtain historical operating data of the turbine for the entire timeframe of interest.

In practice, the data-analytics platform may obtain historical operating data that takes the form of sensor signal data for some or all sensors of each active member of the target turbine's time-varying cluster. In some cases, the data-analytics platform may obtain signal data from the same sensors for both the target turbine and each other active member of the target turbine's time-varying cluster. That is, the data-analytics platform may obtain matching operating data for the target turbine and the other active member(s) of the target turbine's time-varying cluster. Additionally or alternatively, the data-analytics platform may obtain signal data from sensors that are configured to measure the same or similar operating conditions but are not necessarily the same sensor. Other examples are also possible.

Next, the data-analytics platform may optionally determine operating-data differentials based on the historical operating data for the target turbine and the other active member(s) of the target turbine's time-varying cluster, which may be used as "training data." (It should be understood that, in such an example, certain portions of the historical operating data may also be used as "training data" as well). Whether this operation is performed may depend on the nature of the predictive model that is being defined. In instances where operating-data differentials are not utilized, the historical operating data alone may be used as "training data."

In any event, the data-analytics platform may determine the operating-data differentials in a variety of manners. In one example embodiment, the data-analytics platform may perform this operation by comparing the historical operating data of the target turbine over the timeframe of interest with the historical operating data of each other active member of the target turbine's time-varying cluster and then determining the difference between such data.

In other example embodiments, instead of determining operating-data differentials relative to each other active member's operating data, the data-analytics platform may determine representative historical operating data for the time-varying "virtual turbine" of the target turbine's time-varying cluster and then determine operating-data differentials between the historical operating data of the target turbine and the representative historical operating data for this virtual turbine over the timeframe of interest. The data-analytics platform may determine the representative historical operating data for the time-varying virtual turbine of the target turbine's time-varying cluster in a variety of manners.

In example embodiments, the data-analytics platform may determine the representative historical operating data for the time-varying virtual turbine of the target turbine's time-varying cluster based on one or more calculations involving the historical operating data of the active members of the target turbine's cluster during the timeframe of interest. For instance, the data-analytics platform may determine average, maximum, minimum, median, etc. operating-data values for the active members of the target turbine's time-varying cluster at various times over the timeframe of interest. Based on those determinations, the data-analytics platform may then define the virtual turbine's representative historical operating data. After the data-analytics platform determines representative historical operating data for the virtual turbine, it may then compare the virtual turbine's representative historical operating data to the target turbine's historical operating data at various times over the timeframe of interest to determine a single set of operating-data differentials for each of those times.

The data-analytics platform may then define a predictive model related to the operation of the target turbine based at least on the training data described above (e.g., the historical operating data for the target turbine and the other active member(s) of the target turbine's time-varying cluster and/or the operating-data differentials). The predictive model for the target turbine may take a variety of forms, but it may generally represent a relationship between (i) operating data for the target turbine as it relates to operating data for the other active member(s) of the target turbine's cluster and (ii) a likelihood that the target turbine either is presently experiencing an abnormal event (e.g., an operational anomaly) or will experience an abnormal event (e.g., a turbine-wide or subsystem failure) within a certain amount of time in the future. In this way, the data-analytics platform may define a predictive model for the target turbine based at least on historical operating data of the target turbine and the other active member(s) of the target turbine's cluster from the timeframe of interest in the past.

The data-analytics platform may define the predictive model in a variety of manners. For example, various modeling techniques may be used to carry out this function, examples of which may include machine-learning techniques, including supervised and unsupervised techniques. In one particular example embodiment, the data-analytics platform may apply a supervised machine-learning technique to the training data to define a failure model for identifying the likelihood that the target turbine will experience a failure within a certain amount of time in the future. In another particular example embodiment, the data-analytics platform may apply an unsupervised machine-learning technique to the training data to define an anomaly detection model for identifying whether the target turbine is experiencing an operational anomaly.

The aforementioned process for defining turbine-specific models may be advantageous over other processes for a variety of reasons. For instance, compared to other processes that typically define a single model for a cluster of wind turbines, turbine-specific predictive models may be more accurate and/or robust for the particular wind turbine. Moreover, defining a turbine-specific model based on time-varying clusters and operating data related thereto may also help define a more accurate and/or robust model than one defined based on static clusters. Numerous other advantages are also possible.

After the target turbine's predictive model is defined, an example run-time phase may involve the data-analytics platform executing a predictive model for the target turbine based at least on recent operating data for the target turbine and for the other active member(s) of the target turbine's cluster. Depending on the nature of the particular predictive model, the run-time phase may result in the data-analytics platform determining a likelihood that the particular turbine is presently experiencing an abnormal event (e.g., an operational anomaly) or will experience an abnormal event (e.g., a failure) within a certain amount of time in the future.

More specifically, the run-time phase may begin with the data-analytics platform identifying the target turbine as the particular turbine to run analytics for. Then, the data-analytics platform may identify the target turbine's cluster at the time of the analysis. The data-analytics platform may perform this operation in a variety of manners.

In example embodiments, the data-analytics platform may perform operations similar to those described before during the training phase. For instance, the data-analytics platform may utilize recent environmental data that provides a measure of one or more environmental conditions that the target turbine has recently experienced and perhaps also location data of the target turbine. The data-analytics platform may then compare the target turbine's recent environmental data (and perhaps location data) to recent environmental data that provides a measure of the same environmental condition(s) (and perhaps location data) for other wind turbines at the wind site, in order to identify other wind turbines that have sufficiently similar recent measurements of the same environmental condition(s) to the target turbine's measurements. Based on that identification, the data-analytics platform may then identify the wind turbines that are presently considered to be part of the target turbine's cluster.

Next, the data-analytics platform may identify which turbines presently included in the target turbine's cluster are active. The data-analytics platform may perform this operation in a variety of manners. In example embodiments, the data-analytics platform may perform operations similar to those described before during the training phase except that, instead of utilizing historical wind-turbine related data, the data-analytics platform may utilize at least some recent wind-turbine related data.

Thereafter, the data-analytics platform may obtain recent operating data for the target turbine and each other active member of the target turbine's cluster. In example embodiments, this operation may involve the data-analytics platform receiving or otherwise obtaining one or multiple streams of data that includes operating data for the target turbine and each other active member of the target turbine's cluster. Next, the data-analytics platform may determine the virtual turbine's operating data from the recent operating data collected from each active member of the target turbine's cluster.

For instance, in example embodiments, the data-analytics platform may optionally determine operating-data differentials based on the recent operating data for the target turbine and the other active member(s) of the target turbine's cluster, which may then be used by the data-analytics platform as "run-time data." As with the training phase, whether this operation occurs may depend on the nature of the predictive model that is being executed. In example embodiments that do involve this operation, the data-analytics platform may perform this operation in line with the above discussion with respect to the training phase. In instances where operating-data differentials are not utilized, the recent operating data for the virtual turbine alone may be used as "run-time data."

Next, the data-analytics platform may execute the predictive model for the target turbine based on the run-time data. In general, executing the predictive model may involve utilizing recent operating data and/or differentials for the target turbine and the other active member(s) of the target turbine's cluster as input data for the predictive model that then outputs a likelihood that the target turbine is either presently experiencing an abnormal event (e.g., an operational anomaly) or will experience an abnormal event (e.g., a turbine-wide or subsystem failure) within a certain amount of time in the future. The data-analytics platform may execute the predictive model in a variety of manners, which may depend on the nature of the predictive model.

The data-analytics platform may use the output from executing the predictive model in a variety of ways. In one embodiment, the data-analytics platform may cause an action at one or more output systems via a network communication over a communication network. For example, the data-analytics platform may cause a graphical user interface to display a representation of the likelihood that the target turbine is presently experiencing an abnormal event or will experience an abnormal event within a certain amount of time in the future, which may take the form of text, graphics, and/or color indicative of the likelihood.

Additionally or alternatively, the data-analytics platform may cause an action at the target turbine. In particular, depending on the output of the executed predictive model, the data-analytics platform may send a control signal directed to the target turbine that causes the turbine to change its operational state. For example, if the output of the executed predictive model indicates a relatively high likelihood that the target turbine is presently experiencing or will soon experience an abnormal event at the target turbine, then the data-analytics platform may send a control signal that causes the wind turbine to modify its operation to, for instance, increase pitch of the turbine's blades to decrease the speed at which its rotor is rotating. In another example, the data-analytics platform may cause the target turbine to go inactive all together. In this way, the data-analytics platform may utilize the output of the executed predictive model to proactively modify the operational state of the target turbine, which may prevent a long-term or otherwise more severe failure at the target turbine.

Additionally or alternatively, if the output of the executed predictive model indicates a relatively low likelihood that the target turbine is presently experiencing or will soon experience an abnormal event, then the data-analytics platform may send a control signal that causes the wind turbine to modify its operation to, for instance, decrease pitch of the turbine's blades to increase the speed at which the rotor is rotating, thereby generating more electricity. In this way, the data-analytics platform may utilize the output of the executed predictive model to optimize the electricity generation and long-term health of the target turbine. Other examples of operations that are triggered based on the output of the predictive model are also possible.

As discussed above, the examples provided herein are generally related to defining and executing turbine-specific predictive models.

In one aspect, a computing system is provided. The computing system comprises a network interface configured to facilitate communications over a communication network with one or more wind-turbine data sources, at least one processor, a non-transitory computer-readable medium, and program instructions stored on the non-transitory computer-readable medium that are executable by the at least one processor. The program instructions are executable by the at least one processor to cause the computing system to: for each given wind turbine of the plurality of wind turbines, define a predictive model related to the operation of the given wind turbine, wherein defining the predictive model comprises: identifying a historical-time-varying wind-turbine cluster that the given wind turbine was a member of during a period of time in the past, wherein the historical-time-varying wind-turbine cluster comprises a plurality of past-active wind turbines that were active during at least a portion of the period of time; and based on (i) historical operating data for each of the plurality of past-active wind turbines and (ii) historical operating data for the given wind turbine, defining the predictive model related to the operation of the given wind turbine; and for each given wind turbine of the plurality of wind turbines, execute the predictive model related to the operation of the given wind turbine, wherein executing the predictive model comprises: identifying a wind-turbine cluster that the given wind turbine is a member of, wherein the wind-turbine cluster comprises a plurality of active wind turbines including the given wind turbine; based on (i) recent operating data for at least one of the plurality of active wind turbines other than the given wind turbine and (ii) recent operating data for the given wind turbine, executing the predictive model to output a prediction related to the operation of the given wind turbine; and causing a graphical user interface that is communicatively coupled to the computing system to display a representation of the output of the executed predictive model.

In another aspect, a computer implemented method is provided. The method comprises: for each given wind turbine of a plurality of wind turbines, defining a predictive model related to the operation of the given wind turbine, wherein defining the predictive model comprises: identifying a historical-time-varying wind-turbine cluster that the given wind turbine was a member of during a period of time in the past, wherein the historical-time-varying wind-turbine cluster comprises a plurality of past-active wind turbines that were active during at least a portion of the period of time; and based on (i) historical operating data for each of the plurality of past-active wind turbines and (ii) historical operating data for the given wind turbine, defining the predictive model related to the operation of the given wind turbine; and for each given wind turbine of the plurality of wind turbines, executing the predictive model related to the operation of the given wind turbine, wherein executing the predictive model comprises: identifying a wind-turbine cluster that the given wind turbine is a member of, wherein the wind-turbine cluster comprises a plurality of active wind turbines including the given wind turbine; based on (i) recent operating data for at least one of the plurality of active wind turbines other than the given wind turbine and (ii) recent operating data for the given wind turbine, executing the predictive model to output a prediction related to the operation of the given wind turbine; and causing a graphical user interface that is communicatively coupled to the computing system to display a representation of the output of the executed predictive model.

In yet another aspect, a non-transitory computer-readable medium is provided having program instructions stored thereon that are executable to cause a computing system to: for each given wind turbine of a plurality of wind turbines, defining a predictive model related to the operation of the given wind turbine, wherein defining the predictive model comprises: identifying a historical-time-varying wind-turbine cluster that the given wind turbine was a member of during a period of time in the past, wherein the historical-time-varying wind-turbine cluster comprises a plurality of past-active wind turbines that were active during at least a portion of the period of time; and based on (i) historical operating data for each of the plurality of past-active wind turbines and (ii) historical operating data for the given wind turbine, defining the predictive model related to the operation of the given wind turbine; and for each given wind turbine of the plurality of wind turbines, executing the predictive model related to the operation of the given wind turbine, wherein executing the predictive model comprises: identifying a wind-turbine cluster that the given wind turbine is a member of, wherein the wind-turbine cluster comprises a plurality of active wind turbines including the given wind turbine; based on (i) recent operating data for at least one of the plurality of active wind turbines other than the given wind turbine and (ii) recent operating data for the given wind turbine, executing the predictive model to output a prediction related to the operation of the given wind turbine; and causing a graphical user interface that is communicatively coupled to the computing system to display a representation of the output of the executed predictive model.

One of ordinary skill in the art will appreciate these as well as numerous other aspects in reading the following disclosure.

DETAILED DESCRIPTION

The following disclosure makes reference to the accompanying figures and several exemplary scenarios. One of ordinary skill in the art will understand that such references are for the purpose of explanation only and are therefore not meant to be limiting. Part or all of the disclosed systems, devices, and methods may be rearranged, combined, added to, and/or removed in a variety of manners, each of which is contemplated herein.

I. Example Network Configuration

Figure 1:
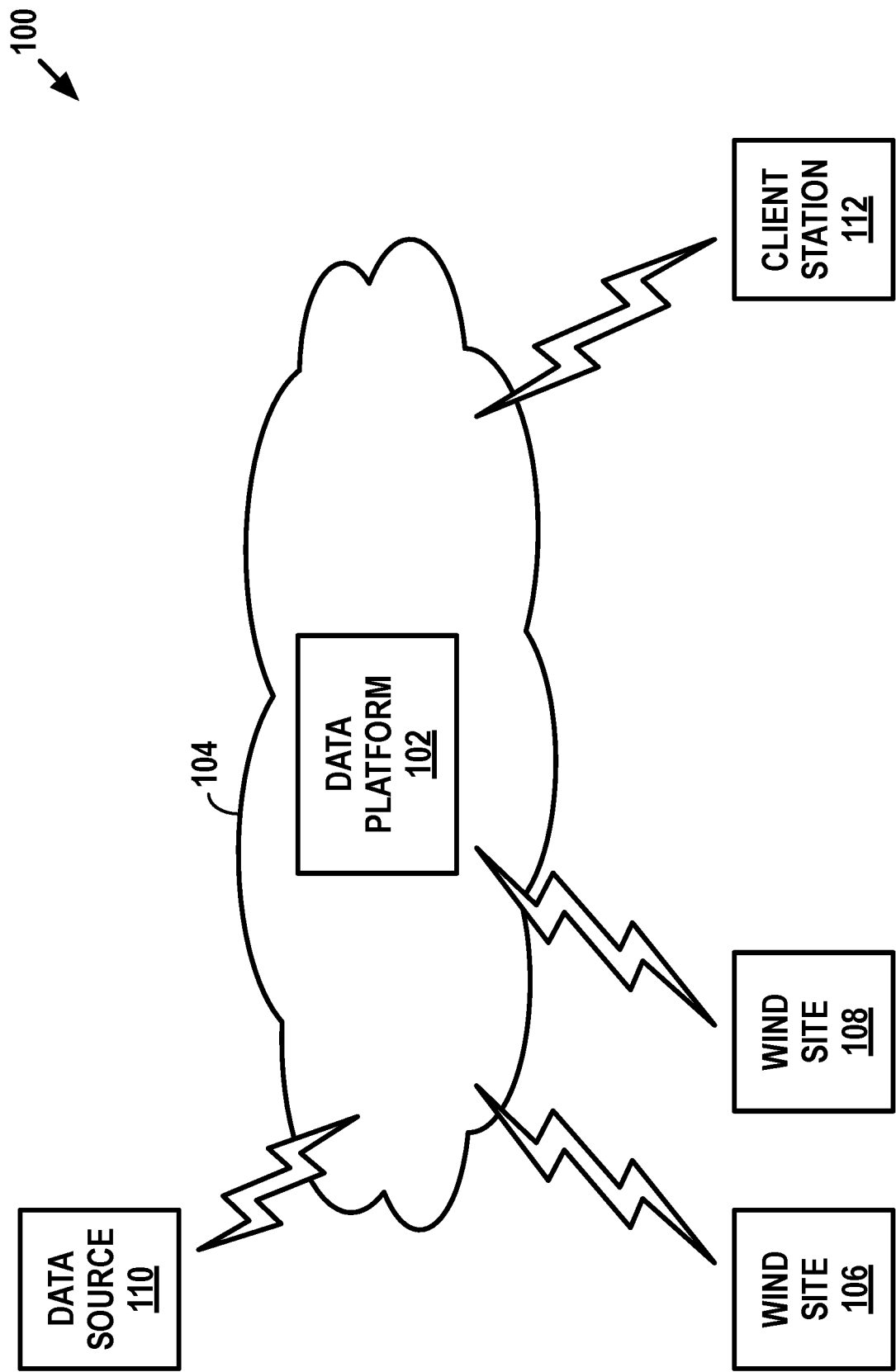
FIG. 1 depicts an example network configuration in which example embodiments may be implemented.

Turning now to the figures, FIG. 1 depicts an example network configuration 100 in which example embodiments may be implemented. As shown, the network configuration 100 includes at its core a remote computing system 102 that may be configured as a data platform (sometimes referred to herein as a "data-analytics platform" or a "condition-monitoring system"), which may communicate via a communication network 104 with one or more wind sites, such as representative wind sites 106 and 108, one or more data sources, such as representative data source 110, and one or more output systems, such as representative client station 112. As discussed in further detail, each wind site 106 and 108 may include one or more wind turbines that provide electricity to a power grid. It should be understood that the network configuration 100 may include various other systems as well.

Broadly speaking, the data platform 102 may take the form of one or more computer systems that are configured to receive, ingest, process, analyze, and/or provide access to wind-turbine attribute data. For instance, the data platform 102 may include one or more servers (or the like) having hardware components and software components that are configured to carry out one or more of the functions disclosed herein for receiving, ingesting, processing, analyzing, and/or providing access to wind-turbine attribute data. Additionally, the data platform 102 may include one or more user interface components that enable a platform user to interface with the platform. In practice, these computing systems may be located in a single physical location or distributed amongst a plurality of locations, and may be communicatively linked via a system bus, a communication network (e.g., a private network), or some other connection mechanism. Further, the data platform 102 may be arranged to receive and transmit data according to dataflow technology, such as TPL Dataflow or NiFi, among other examples. The platform may take other forms as well. The data platform 102 is discussed in further detail below with reference to FIGS. 4-5.

As shown in FIG. 1, the data platform 102 may be configured to communicate, via the communication network 104, with the one or more wind sites, data sources, and/or output systems in the network configuration 100. For example, the data platform 102 may receive wind-turbine attribute data, via the communication network 104, that is sent by one or more wind turbines or wind-site control centers and/or data sources 110. As another example, the data platform 102 may transmit wind-turbine attribute data and/or commands, via the communication network 104, for receipt by an output system, such as a client station, a work-order system, a parts-ordering system, etc. The data platform 102 may engage in other types of communication via the communication network 104 as well.

In general, the communication network 104 may include one or more computing systems and network infrastructure configured to facilitate transferring data between the data platform 102 and the one or more wind sites, data sources, and/or output systems in the network configuration 100. The communication network 104 may be or may include one or more Wide-Area Networks (WANs) and/or Local-Area Networks (LANs), which may be wired and/or wireless and may support secure communication. In some examples, the communication network 104 may include one or more cellular networks and/or the Internet, among other networks. The communication network 104 may operate according to one or more communication protocols, such as LTE, CDMA, GSM, LPWAN, WiFi, Bluetooth, Ethernet, HTTP/S, TCP, CoAP/DTLS and the like. Although the communication network 104 is shown as a single network, it should be understood that the communication network 104 may include multiple, distinct networks that are themselves communicatively linked. Further, in example cases, the communication network 104 may facilitate secure communications between network components (e.g., via encryption or other security measures). The communication network 104 could take other forms as well.

Further, although not shown, the communication path between the data platform 102 and the one or more wind sites, data sources, and/or output systems may include one or more intermediate systems. For example, the one or more wind sites and/or data sources may send wind-turbine attribute data to one or more intermediary systems, such as a wind-turbine gateway or an organization's existing platform (not shown), and the data platform 102 may then be configured to receive the wind-turbine attribute data from the one or more intermediary systems. As another example, the data platform 102 may communicate with an output system via one or more intermediary systems, such as a host server (not shown). Many other configurations are also possible.

In general, the wind sites 106 and 108 each include one or more wind turbines that convert wind energy into electricity that is provided to a power grid. As discussed in further detail below, each wind site provides to the data platform 102 wind-turbine attribute data for the one or more wind turbines within the given wind site (e.g., data indicative of a wind turbine's operation, electricity production, configuration, and/or meteorological conditions). The data platform 102 is configured to define predictive models based on such data and/or perform predictive analytics on behalf of the wind turbines. Exemplary wind sites and wind turbines are discussed in detail below with reference to FIG. 2 and FIG. 3, respectively.

In general, the data source 110 may be or include one or more computing systems configured to collect, store, and/or provide data that is related to wind turbines or is otherwise relevant to the functions performed by the data platform 102. For example, the data source 110 may collect and provide wind-turbine attribute data that originates from wind sites or wind turbines (e.g., historical wind-turbine operating data and/or historical environmental data corresponding thereto), in which case the data source 110 may serve as an alternative source for such wind-turbine attribute data. As another example, the data source 110 may be configured to provide data that does not originate from wind sites or wind turbines (e.g., weather and other environmental data), which may be referred to herein as "external data." Such a data source may take various forms.

In one implementation, the data source 110 could take the form of an environmental data source that is configured to provide data indicating some characteristic of the environment in which wind sites are located. Examples of environment data sources include image-data servers (e.g., servers maintaining satellite, camera-based, and/or remotely-sensed image data), map-data servers, weather-data servers, global navigation satellite systems (GNSS) servers, and topography-data servers that provide information regarding natural and artificial features of a given area, among other examples.

In another implementation, the data source 110 could take the form of a turbine-management data source that provides data indicating events or statuses of entities (e.g., other assets) that may affect the operation or maintenance of wind turbines (e.g., when a wind turbine may receive maintenance). Examples of turbine-management data sources include turbine-maintenance servers that provide information regarding inspections, maintenance, services, and/or repairs that have been performed and/or are scheduled to be performed on turbines, power-grid servers that provide information reflecting times and/or dates of electricity consumption and/or power demand, part-supplier servers that provide information regarding parts that particular suppliers have in stock and prices thereof, and fluid-analysis servers that provide information regarding the results of analyses of wind-turbine fluids, among other examples. One of ordinary skill in the art will appreciate that these are but a few examples of data sources and that numerous others are possible.

The data platform 102 may receive data from the data source 110 in various manners. According to one example, the data platform 102 may be configured to periodically request and receive data from the data source 110. In another example, the data platform 102 may receive data from the data source 110 by "subscribing" to a service provided by the data source. The data platform 102 may receive data from the data source 110 in other manners as well.

The client station 112 may take the form of a computing system or device configured to access and enable a user to interact with the data platform 102. To facilitate this, the client station may include hardware components such as a user interface, a network interface, a processor, and data storage, among other components. Additionally, the client station may be configured with software components that enable interaction with the data platform 102 via a graphical user interface or the like, such as a web browser that is capable of accessing a web application provided by the data platform 102 or a native client application associated with the data platform 102, among other examples. Representative examples of client stations may include a desktop computer, a laptop, a netbook, a tablet, a smartphone, a personal digital assistant (PDA), or any other such device now known or later developed.

Other examples of output systems may include a work-order system configured to output a request for a mechanic or the like to repair a wind turbine or a parts-ordering system configured to place an order for a part of a wind turbine and output a receipt thereof, among others.

It should be understood that the network configuration 100 is one example of a network in which embodiments described herein may be implemented. Numerous other arrangements are possible and contemplated herein. For instance, other network configurations may include additional components not pictured and/or more or less of the pictured components.

II. Example Wind Site

Figure 2:
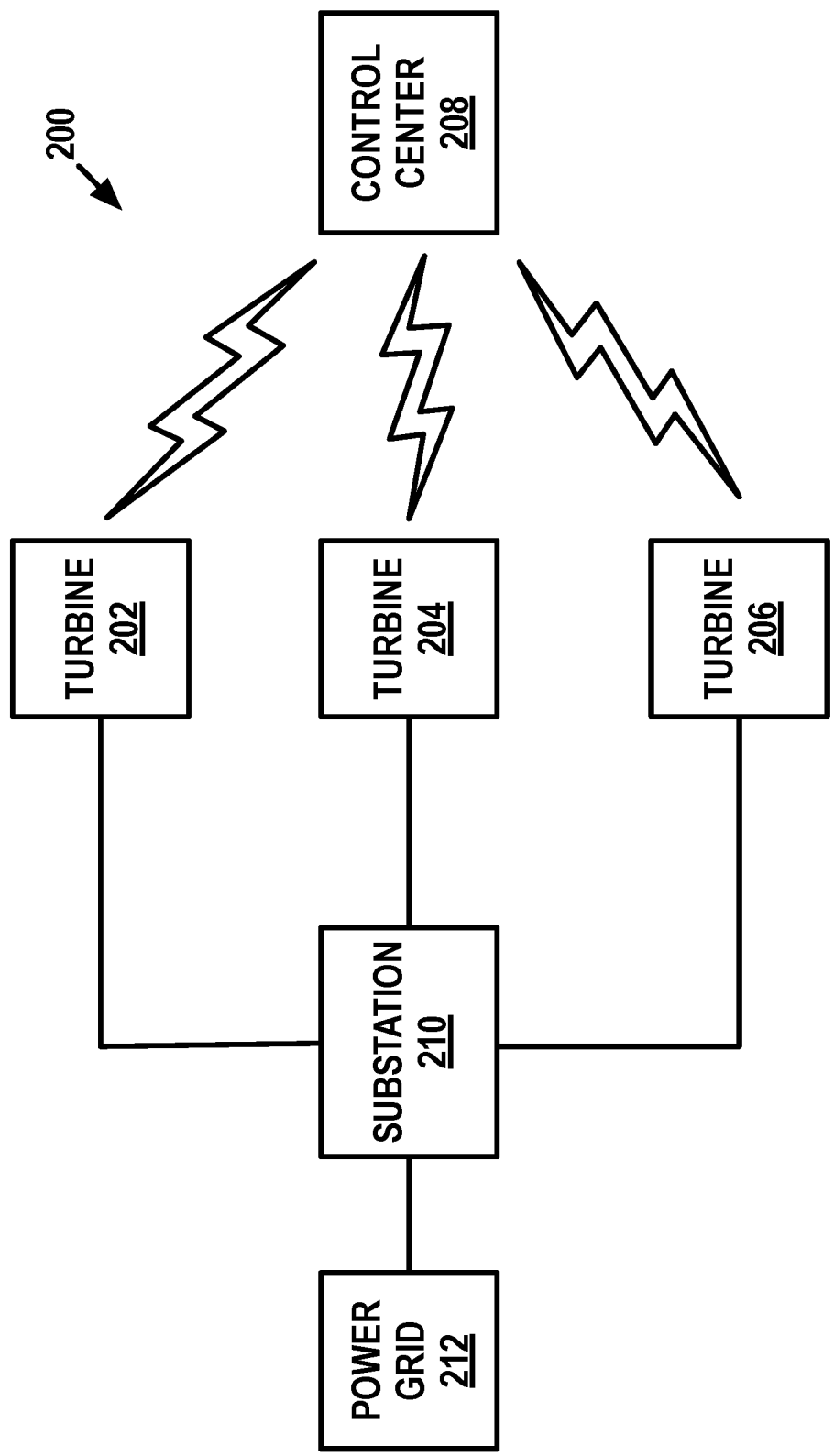
FIG. 2 depicts a simplified block diagram of an example wind site coupled to a power grid.

Turning to FIG. 2, a simplified block diagram of an example wind site 200 that is coupled to a power grid is depicted. Either or both of the wind sites 106 and 108 from FIG. 1 may be configured like the wind site 200. As shown in FIG. 2, the wind site 200 may include one or more wind turbines 202, 204, and 206, at least one control center 208, and at least one substation 210. The wind site 200 may be coupled to a power grid 212 via the substation 210. It should be understood that the wind site 200 may include additional components not shown and/or more or less of the depicted components. For instance, in example embodiments, the wind site 200 may include multiple control centers. Other examples wind site configurations are also possible.

Generally, each wind turbine 202-206 is configured to convert wind energy into electricity that is provided to the substation 210 via a wired connection, such as a transmission line. The substation 210 in turn provides that electricity to the power grid 212. Wind turbines are discussed in further detail below with reference to FIG. 3.

In practice, the wind site 200 may be distributed across a geographical area that includes a uniform or variable topography. Moreover, the geographical area may be of a size such that environmental conditions may vary across the geographical area. For example, some portion of the geographical area may experience wind patterns, wind speeds, temperature, humidity, etc. that differs from other portions of the geographical area. Accordingly, at any given point in time, some of the wind turbines 202-206 of the wind site 200 may experience one or more environmental conditions in a different manner than other wind turbines, which may result in one wind turbine degrading faster or slower than other wind turbines.

In general, the control center 208 may be configured to manage the operation of the wind turbines 202-206. For example, the control center 208 may be configured to send commands that cause certain wind turbines to activate or deactivate (i.e., attempt to capture wind energy or not). To facilitate this and other functions of the control center 208, the control center 208 may include hardware components such as a user interface, one or more network interfaces, one or more processors, and data storage, among other components. In example embodiments, the one or more processors may take the form of a general- or special-purpose processor and in particular, the one or more processors may be or include microprocessors, microcontrollers, application specific integrated circuits, digital signal processors, and the like. In turn, the data storage may be or include one or more non-transitory computer-readable storage media, such as optical, magnetic, organic, or flash memory, among other examples.

The control center 208 may be communicatively coupled to the wind turbines 202-206 via a wireless or wired network, or a combination thereof. The control center 208 may use such a network to collect wind-turbine attribute data from some or all of the wind turbines 202-206 and perhaps maintain that data in data storage. Moreover, the control center 208 may be communicatively coupled to one or more data platforms, such as the data platform 102 from FIG. 1, via a wireless and/or wired network, and may provide the one or more data platforms with wind-turbine attribute data.

As mentioned before, the substation 210 may be electrically coupled to the wind turbines 202-206 and may be generally configured to collect electricity from the wind turbines and provide that electricity to the power grid 212. To facilitate these operations, the substation 210 may include one or more electricity collection systems, one or more transformers (e.g., one or more step-up transformers), and infrastructure for coupling the substation 210 to the power grid 212, among other components. Moreover, the substation 210 may be configured to provide to the control center 208 electricity-production data for each of the wind turbines 202-206 indicating how much electricity each turbine is generating at any given time.

The power grid 212 may generally include infrastructure for providing electricity to utility companies and/or residents, among other possibilities. To help facilitate this, the power grid 212 may take the form of or include transmission lines configured to carry electricity to particular recipients. The power grid 212 may include additional components as well.

III. Example Wind Turbine

Figure 3:
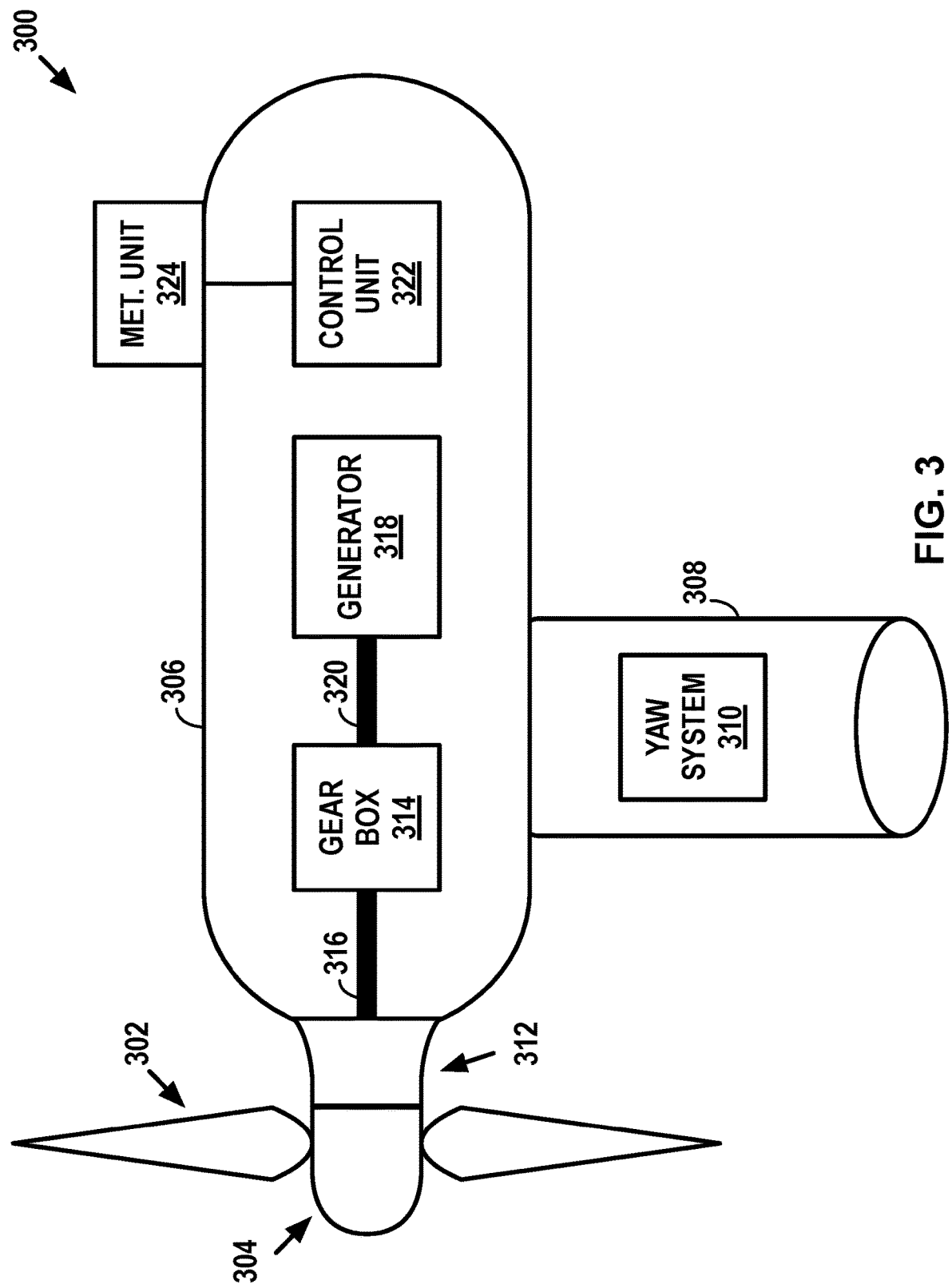
FIG. 3 depicts a simplified diagram of an example wind turbine.

Turning to FIG. 3, a simplified diagram of an example wind turbine 300 is depicted. Some or all of the wind turbines 202-206 from FIG. 2 may be configured like the wind turbine 300. As shown in FIG. 3, the wind turbine 300 includes multiple blades 302 that are mounted to a hub 304 that collectively form a rotor that is configured to rotate as wind passes over the blades 302. The rotor is connected to a nacelle 306 that sits atop a tower 308.

Within the tower 308, a yaw system 310 may be included that is generally configured to control the position of the upper structure of the wind turbine 300 (e.g., the rotor and nacelle 306) to align the upper structure in a desired direction relative to the wind's direction. To help facilitate this, the yaw system 310 may include one or more motors and/or other actuators, drive shafts, gears, and control units, among other components.

The wind turbine 300 may also include a pitch system 312 that may be separate from or part of the hub 304. The pitch system 312 may be generally configured to change the angle of the pitch of the blades 302 to help control the rotational speed of the rotor, and the pitch system 312 may also be configured to activate or deactivate the rotor's ability to rotate (e.g., by engaging or disengaging a brake or the like). To help facilitate these operations, the pitch system 312 may include one or more motors and/or other actuators, drive shafts, brakes, and control units, among other components.

The yaw system 310 and pitch system 312 may be referred to collectively herein as the wind turbine's "positioning system."

The wind turbine 300 may include a number of subsystems within or atop of the nacelle 306. As shown in FIG. 3, the hub 304 of the rotor is physically coupled to a gear box 314 via a drive shaft 316, which may take the form of a low-speed drive shaft. The gear box 314 in turn is physically coupled to a generator 318 via a drive shaft 320, which may take the form of a high-speed drive shaft. The generator 318 is configured to generate electricity that travels on a wire (not shown) that extends down the tower 308 to the substation 210 of FIG. 2.

In general, the gear box 314 operates to connect the drive shaft 316 to the drive shaft 320. The gear box 314 may include two or more gears of differing sizes that facilitate causing the drive shaft 320 to rotate at a higher rate than the drive shaft 316. As a result, the drive shaft 320 is configured to rotate at a rate that is sufficient to cause the generator 318 to produce electricity. In some example embodiments, the wind turbine 300 may not include a gear box 314, such as when the generator 318 is a "direct-drive" generator.

As suggested above, the generator 318 is configured to convert mechanical energy into electricity. In particular, the generator 318 is driven by the drive shaft 320 and as the drive shaft 320 spins, converts the mechanical energy of the drive shaft 320 into electricity. The generator 318 may take the form of an induction generator, among other possibilities.

The nacelle 306 also includes a control unit 322 that generally manages the operation of the wind turbine 300. The control unit 322 may include one or more processors (similar in nature to the above-discussed processors) and data storage (similar in nature to the above-discussed data storage) that includes program instructions that when executed by the one or more processors cause the control unit 322 to perform various functions, some of which are described herein. The control unit 322 may be communicatively linked (either directly or indirectly) by a system bus, network, or other connection mechanism to one or more of the wind turbine's subsystems, such as the yaw system 310, the pitch system 312, and/or perhaps other subsystems. Moreover, the control unit 322 may be communicatively coupled to a meteorological unit 324 that sits atop of the nacelle 306 and is configured to measure meteorological attributes of the wind turbine's surroundings. The meteorological unit 324 may include a wind vane, an anemometer, and/or a variety of sensors configured to measure a variety of meteorological attributes. The meteorological unit 324 may output meteorological data indicative of measured meteorological attributes, which the control unit 322 may be configured to maintain in data storage.

As used herein, "meteorological" and "environmental" are generally used to indicate the same types of conditions/attributes. However, "environmental" data may originate from an external data source, such as the data source 110 of FIG. 1, or from a wind site or perhaps even a wind turbine. On the other, "meteorological" data generally originates from a wind turbine and in particular, from the wind turbine's own equipment and sensors, such as from the turbine's meteorological unit 324.

In operation, measured meteorological attributes may cause the control unit 322 to in turn control one or more of the wind turbine's subsystems. For example, the meteorological unit 324 may provide the control unit 322 a signal that represents the present wind direction, which may in turn cause the control unit 322 to control the yaw system 310 to pivot the wind turbine a certain number of degrees clockwise to align with the wind direction. As another example, the control unit 322 may receive from the meteorological unit 324 a signal that represents the present wind speed, which may in turn cause the control unit 322 to cause the pitch system 312 to disable the rotor from spinning (e.g., engage a brake) in the event that the wind speed is above a threshold speed. Other example operations are also possible.

The wind turbine 300 may also be outfitted with various sensors that are configured to monitor operating conditions of the wind turbine 300. In some cases, multiple sensors may be grouped based on a particular subsystem of the wind turbine 300. In this way, the group of sensors may be configured to monitor operating conditions of the particular subsystem.

In general, a sensor may be configured to detect a physical property, which may be indicative of one or more operating conditions of the wind turbine 300, and provide a representation, such as an electrical signal, of the detected physical property. In operation, the sensors may be configured to obtain measurements continuously, periodically (e.g., based on a sampling frequency), and/or in response to some triggering event. In some examples, the sensors may be preconfigured with operating parameters for performing measurements and/or may perform measurements in accordance with operating parameters provided by the control unit 322 (e.g., signals that instruct the sensors to obtain measurements). In examples, different sensors may have different operating parameters (e.g., some sensors may sample based on a first frequency, while other sensors sample based on a second, different frequency). In any event, the sensors may be configured to transmit electrical signals representing a measured physical property to the control unit 322 or perhaps a local analytics device if one is present. The sensors may continuously or periodically provide such signals.

For instance, sensors may be configured to measure physical properties such as the location of the wind turbine 300 and/or operating conditions of the wind turbine 300, examples of which may include temperatures, pressures, vibrations, rotational speeds, friction, power usages, fluid levels, runtimes, voltages and currents, magnetic fields, electric fields, positions of components, and power generation, among other examples. At least some of the aforementioned components of the wind turbine 300 may include bearings and/or fluids, such as oils, hydraulic fluids, and/or other lubricating fluids, for which sensors may be provided to measure operating conditions thereof. One of ordinary skill in the art will appreciate that these are but a few example operating conditions that sensors may be configured to measure. Additional or fewer sensors may be used depending on the specific type of wind turbine.

The control unit 322 may be configured to receive respective sensor signals from the sensors and may store sensor data in and later access it from data storage. Additionally, the control unit 322 may be configured to access and/or generate data reflecting the configuration of the wind turbine 300 (e.g., model number, turbine usage, software versions installed, etc.). Moreover, the control 322 may be configured to monitor, store, and later access electricity-production data indicative of how much electricity the wind turbine 300 is generating at a given point in time. The control unit 322 may be configured to provide the control center 208 of FIG. 2 and/or the data platform 102 of FIG. 1 any or all of this wind-turbine data, as well as measured meteorological data. In some embodiments, the control unit 322 may include a wireless network interface that facilitates the control unit 322 transmitting such data wirelessly.

Additionally, the control unit 322 may be configured to modify the rate at which it processes data from the sensors and/or meteorological unit 324, or the control unit 322 may be configured to provide instruction signals that cause them to, for example, modify a sampling rate. Moreover, the control unit 322 may be configured to receive signals from any of the wind turbine 300's subsystems, sensors, and/or the control center 208 of FIG. 2, and based on such signals, cause an operation to occur at the wind turbine 300. Further still, the control unit 322 may be configured to receive signals from a computing device, such as a diagnostic device, that cause the control unit 322 to execute one or more diagnostic tools in accordance with diagnostic rules stored in data storage. Other functionalities of the control unit 322 are also possible, some of which are discussed below.

In example embodiments, the wind turbine 300 may also include a local analytics device that may be communicatively coupled to the data platform 102 of FIG. 1 via a network (e.g., a WAN) and configured to provide data (e.g., sensor data) related to the present operation of and/or environmental conditions surrounding the wind turbine 300. The details regarding an exemplary local analytics device can be found in U.S. patent application Ser. No. 14/963,207, which is herein incorporated by reference in its entirety. In some embodiments, the control unit 322 may include or take the form of a local analytics device. In certain embodiments, the wind turbine 300 may provide to data platforms wind-turbine related data in other manners.

Although the wind turbine 300 is illustrated as an upwind wind turbine, this is merely for example and explanation purposes only. It should be understood that other wind turbine types, such as downwind wind turbines, could be used instead or as well as the exemplary downwind turbine shown in FIG. 3.

IV. Example Platform

Figure 4:
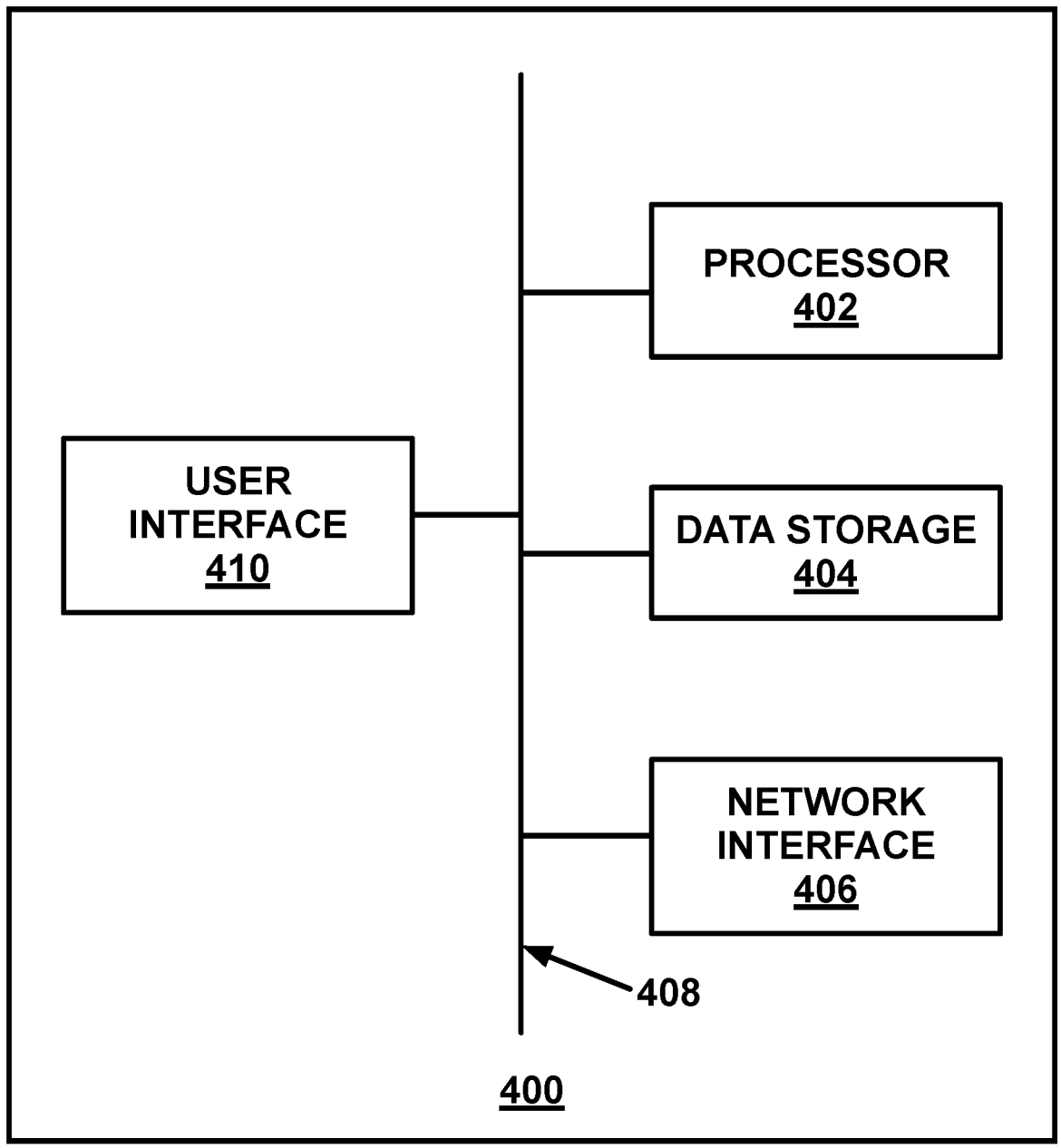
FIG. 4 depicts a structural diagram of an example platform.

FIG. 4 is a simplified block diagram illustrating some components that may be included in an example data platform 400 from a structural perspective. In line with the discussion above, the data platform 400 may generally comprise one or more computer systems (e.g., one or more servers), and these one or more computer systems may collectively include at least a processor 402, data storage 404, network interface 406, and perhaps also a user interface 410, all of which may be communicatively linked by a communication link 408 such as a system bus, network, or other connection mechanism.

The processor 402 may include one or more processors and/or controllers, which may take the form of a general- or special-purpose processor or controller. In particular, in example implementations, the processing unit 402 may include microprocessors, microcontrollers, application-specific integrated circuits, digital signal processors, and the like.

In turn, data storage 404 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, an optical-storage device, etc.

The data storage 404 may be provisioned with software components that enable the data platform 400 to carry out the functions disclosed herein. These software components may generally take the form of program instructions that are executable by the processor 402, and may be arranged together into applications, software development kits, toolsets, or the like. In addition, the data storage 404 may also be provisioned with one or more databases that are arranged to store data related to the functions carried out by the data platform, examples of which include time-series databases, document databases, relational databases (e.g., MySQL), key-value databases, and graph databases, among others. The one or more databases may also provide for poly-glot storage.

The network interface 406 may be configured to facilitate wireless and/or wired communication between the data platform 400 and various network components via the communication network 104, such as the wind sites 106 and 108, the data source 110, and the client station 112. As such, the network interface 406 may take any suitable form for carrying out these functions, examples of which may include an Ethernet interface, a serial bus interface (e.g., Firewire, USB 2.0, etc.), a chipset and antenna adapted to facilitate wireless communication, and/or any other interface that provides for wired and/or wireless communication. The network interface 406 may also include multiple network interfaces that support various different types of network connections, some examples of which may include Hadoop, FTP, relational databases, high frequency data such as OSI PI, batch data such as XML, and Base64. Other configurations are possible as well.

The example data platform 400 may also support a user interface 410 that is configured to facilitate user interaction with the data platform 400 and may also be configured to facilitate causing the data platform 400 to perform an operation in response to user interaction. This user interface 410 may include or provide connectivity to various input components, examples of which include touch-sensitive interfaces, mechanical interfaces (e.g., levers, buttons, wheels, dials, keyboards, etc.), and other input interfaces (e.g., microphones). Additionally, the user interface 410 may include or provide connectivity to various output components, examples of which may include display screens, speakers, headphone jacks, and the like. Other configurations are possible as well, including the possibility that the user interface 410 is embodied within a client station that is communicatively coupled to the example platform.

Figure 5:
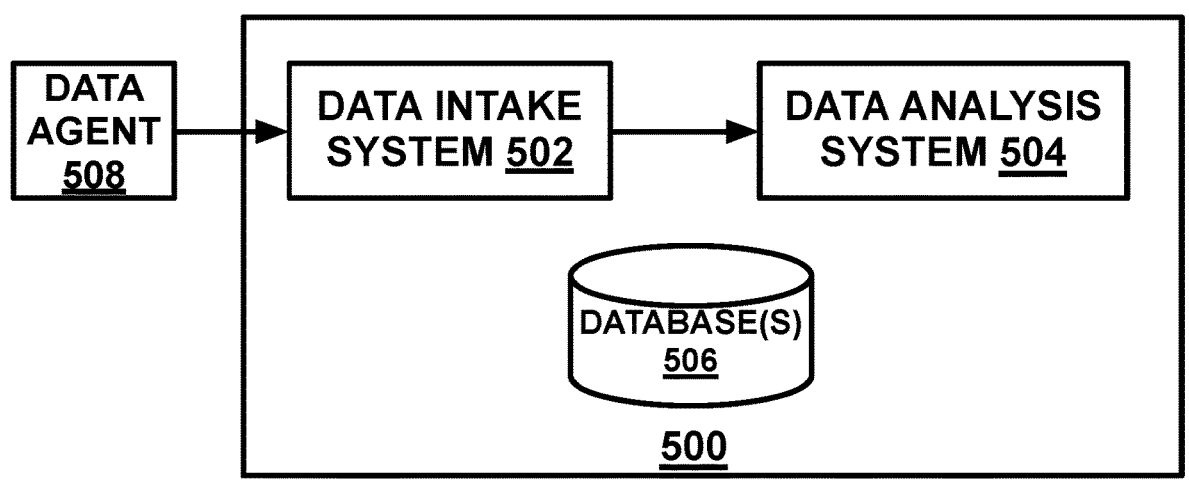
FIG. 5 is a functional block diagram of an example platform.

Referring now to FIG. 5, another simplified block diagram is provided to illustrate some components that may be included in an example data platform 500 from a functional perspective. For instance, as shown, the example data platform 500 may include a data intake system 502 and a data analysis system 504, each of which comprises a combination of hardware and software that is configured to carry out particular functions. The platform 500 may also include a plurality of databases 506 that are included within and/or otherwise coupled to one or more of the data intake system 502 and the data analysis system 504. In practice, these functional systems may be implemented on a single computer system or distributed across a plurality of computer systems.

The data intake system 502 may generally function to receive wind-turbine attribute data and then provide at least a portion of the received data to the data analysis system 504. As such, the data intake system 502 may be configured to receive wind-turbine attribute data from various sources, examples of which may include a wind turbine, a wind site, a wind-turbine attribute data source, or an organization's existing platform/system. The data received by the data intake system 502 may take various forms, examples of which may include analog signals, data streams, and/or network packets. Further, in some examples, the data intake system 502 may be configured according to a given dataflow technology, such as a NiFi receiver or the like.

In some embodiments, before the data intake system 502 receives data from a given source (e.g., an organization's existing platform/system, an external wind-turbine attribute data source, etc.), that source may be provisioned with a data agent 508. In general, the data agent 508 may be a software component that functions to access wind-turbine attribute data at the given data source, place the data in the appropriate format, and then facilitate the transmission of that data to the platform 500 for receipt by the data intake system 502. As such, the data agent 508 may cause the given source to perform operations such as compression and/or decompression, encryption and/or de-encryption, analog-to-digital and/or digital-to-analog conversion, filtration, amplification, and/or data mapping, among other examples. In other embodiments, however, the given data source may be capable of accessing, formatting, and/or transmitting wind-turbine attribute data to the example data platform 500 without the assistance of a data agent.

The wind-turbine attribute data received by the data intake system 502 may take various forms. As one example, the wind-turbine attribute data may include data related to the attributes of a wind turbine in operation, which may originate from the wind turbine itself or from an external source. This wind-turbine attribute data may include wind-turbine operating data such as signal data (e.g., sensor data), among other possibilities. Another example of wind-turbine attribute data may include data related to environmental attributes or conditions surrounding a particular wind turbine, which may originate from the particular wind turbine's meteorological unit.

In addition, the wind-turbine attribute data may also include wind-turbine configuration data, such as data indicating the turbine's brand, make, model, age, software version, etc. As another example, the wind-turbine attribute data may include certain attributes regarding the origin of the wind-turbine attribute data, such as a source identifier, a timestamp (e.g., a date and/or time at which the information was obtained), and an identifier of the location at which the information was obtained (e.g., GPS coordinates). For instance, a unique identifier (e.g., a computer generated alphabetic, numeric, alphanumeric, or the like identifier) may be assigned to each wind turbine, and perhaps to each sensor on the wind turbine, and may be operable to identify the wind turbine and/or sensor from which data originates. These attributes may come in the form of signal signatures or metadata, among other examples. The wind-turbine attribute data received by the data intake system 502 may take other forms as well.

The data intake system 502 may also be configured to perform various pre-processing functions on the wind-turbine attribute data in an effort to provide data to the data analysis system 504 that is clean, up to date, accurate, usable, etc.

For example, the data intake system 502 may map the received data into defined data structures and potentially drop any data that cannot be mapped to these data structures. As another example, the data intake system 502 may assess the reliability (or "health") of the received data and take certain actions based on this reliability, such as dropping any unreliable data. As yet another example, the data intake system 502 may "de-dup" the received data by identifying any data has already been received by the platform and then ignoring or dropping such data. As still another example, the data intake system 502 may determine that the received data is related to data already stored in the platform's databases 506 (e.g., a different version of the same data) and then merge the received data and stored data together into one data structure or record. As a further example, the data intake system 502 may identify actions to be taken based on the received data (e.g., CRUD actions) and then notify the data analysis system 504 of the identified actions (e.g., via HTTP headers). As still a further example, the data intake system 502 may split the received data into particular data categories (e.g., by placing the different data categories into different queues). Other functions may also be performed.

In some embodiments, it is also possible that the data agent 508 may perform or assist with certain of these pre-processing functions. As one possible example, the data mapping function could be performed in whole or in part by the data agent 508 rather than the data intake system 502. Other examples are possible as well.

The data intake system 502 may further be configured to store the received wind-turbine attribute data in one or more of the databases 506 for later retrieval. For example, the data intake system 502 may store the raw data received from the data agent 508 and may also store the data resulting from one or more of the pre-processing functions described above. In line with the discussion above, the databases to which the data intake system 502 stores this data may take various forms, examples of include a time-series database, document database, a relational database (e.g., MySQL), a key-value database, and a graph database, among others. Further, the databases may provide for poly-glot storage. For example, the data intake system 502 may store the payload of received wind-turbine attribute data in a first type of database (e.g., a time-series or document database) and may store the associated metadata of received wind-turbine attribute data in a second type of database that permit more rapid searching (e.g., a relational database). In such an example, the metadata may then be linked or associated to the wind-turbine attribute data stored in the other database that relates to the metadata. The databases 506 used by the data intake system 502 may take various other forms as well.

As shown, the data intake system 502 may then be communicatively coupled to the data analysis system 504. This interface between the data intake system 502 and the data analysis system 504 may take various forms. For instance, the data intake system 502 may be communicatively coupled to the data analysis system 504 via an API. Other interface technologies are possible as well.

In one implementation, the data intake system 502 may provide, to the data analysis system 504, data that falls into the following general categories: (1) signal data, (2) event data, (3) environmental data, and (4) wind-turbine configuration data. The signal data may generally take the form of raw or aggregated data representing the measurements taken by the sensors at the wind turbines. The event data may generally take the form of data identifying events that relate to wind-turbine operation, such as failures, one or more sensor measurements exceeding respective thresholds, inspection events, maintenance events, repair events, fluid events, weather events, or the like. The environmental data may generally take the form of raw or aggregated data representing a measure of one or more environmental conditions surrounding a given wind turbine and may originate from the wind turbine itself (e.g., from the meteorological unit of the wind turbine) or from an external source. And wind-turbine configuration data may then include information regarding the configuration of the wind-turbine, such as wind-turbine identifiers (e.g., serial number, model number, model year, etc.), software versions installed, etc. The data provided to the data analysis system 504 may also include other data and take other forms as well.

The data analysis system 504 may generally function to receive data from the data intake system 502, analyze that data, and then take various actions based on that data. These actions may take various forms.

As one example, the data analysis system 504 may identify certain data that is to be output to a client station (e.g., based on a request received from the client station) and may then provide this data to the client station. As another example, the data analysis system 504 may determine that certain data satisfies a predefined rule and may then take certain actions in response to this determination, such as generating new event data or providing a notification to a user via the client station. As another example, the data analysis system 504 may use the received data to train and/or execute a predictive model related to wind-turbine operation, and the data analysis system 504 may then take certain actions based on the predictive model's output. As still another example, the data analysis system 504 may make certain data available for external access via an API.

In order to facilitate one or more of these functions, the data analysis system 504 may be configured to provide (or "drive") a user interface that can be accessed and displayed by a client station. This user interface may take various forms. As one example, the user interface may be a graphical user interface in the form of a web application, which may generally comprise one or more web pages that can be displayed by the client station in order to present information to a user and also obtain user input. As another example, the user interface may be provided via a native client application that is installed and running on a client station but is "driven" by the data analysis system 504. The user interface provided by the data analysis system 504 may take other forms as well.

In addition to analyzing the received data for taking potential actions based on such data, the data analysis system 504 may also be configured to store the received data into one or more of the databases 506. For example, the data analysis system 504 may store the received data into a given database that serves as the primary database for providing wind-turbine attribute data to platform users.

In some embodiments, the data analysis system 504 may also support a software development kit (SDK) for building, customizing, and adding additional functionality to the platform. Such an SDK may enable customization of the platform's functionality on top of the platform's hardcoded functionality.

The data analysis system 504 may perform various other functions as well. Some functions performed by the data analysis system 504 are discussed in further detail below.

One of ordinary skill in the art will appreciate that the example platform shown in FIGS. 4-5 is but one example of a simplified representation of the components that may be included in a data platform and that numerous others are also possible. For instance, other platforms may include additional components not pictured and/or more or less of the pictured components. Moreover, a given platform may include multiple, individual platforms that are operated in concert to perform operations of the given platform. Other examples are also possible.

V. Example Operations

Example operations of the example network configuration 100 depicted in FIG. 1 will now be discussed in further detail below. To help describe some of these operations, flow diagrams may be referenced to describe combinations of operations that may be performed. In some cases, each block may represent a module or portion of program code that includes instructions that are executable by a processor to implement specific logical functions or steps in a process. The program code may be stored on any type of computer-readable medium, such as non-transitory computer-readable media. In other cases, each block may represent circuitry that is wired to perform specific logical functions or steps in a process. Moreover, the blocks shown in the flow diagrams may be rearranged into different orders, combined into fewer blocks, separated into additional blocks, and/or removed based upon the particular embodiment.

As noted above, disclosed herein are improved systems, devices, and methods for defining and executing a predictive model for an individual wind turbine based on operating data for the individual wind turbine and other wind turbines that were, at one point in time, active members of the individual wind turbine's time-varying cluster. In example embodiments, a data-analytics platform is configured to define, and later execute, a predictive model that is specific for a given wind turbine, which is unlike prior systems that typically define a single model for a cluster of wind turbines. Turbine-specific predictive models may be more accurate and/or robust for the particular wind turbine compared to cluster-wide models. Moreover, unlike other systems that attempt to define a model for a static cluster of wind turbines, the data-analytics platform may define a turbine-specific model based on a time-varying cluster and operating data related thereto, which may also help define a more accurate and/or robust model than one defined based on static clusters. These as well as other advantageous may become apparent to a person of ordinary skill in the art upon reading the disclosure set forth herein.

A data-analytics platform, such as the data platform 102 of FIG. 1, may generally define turbine-specific predictive models during a "training phase" and then execute one or more of the models during a "run-time phase." Each of these phases is discussed in further detail below.

A. Example Training Phase

Figure 6:
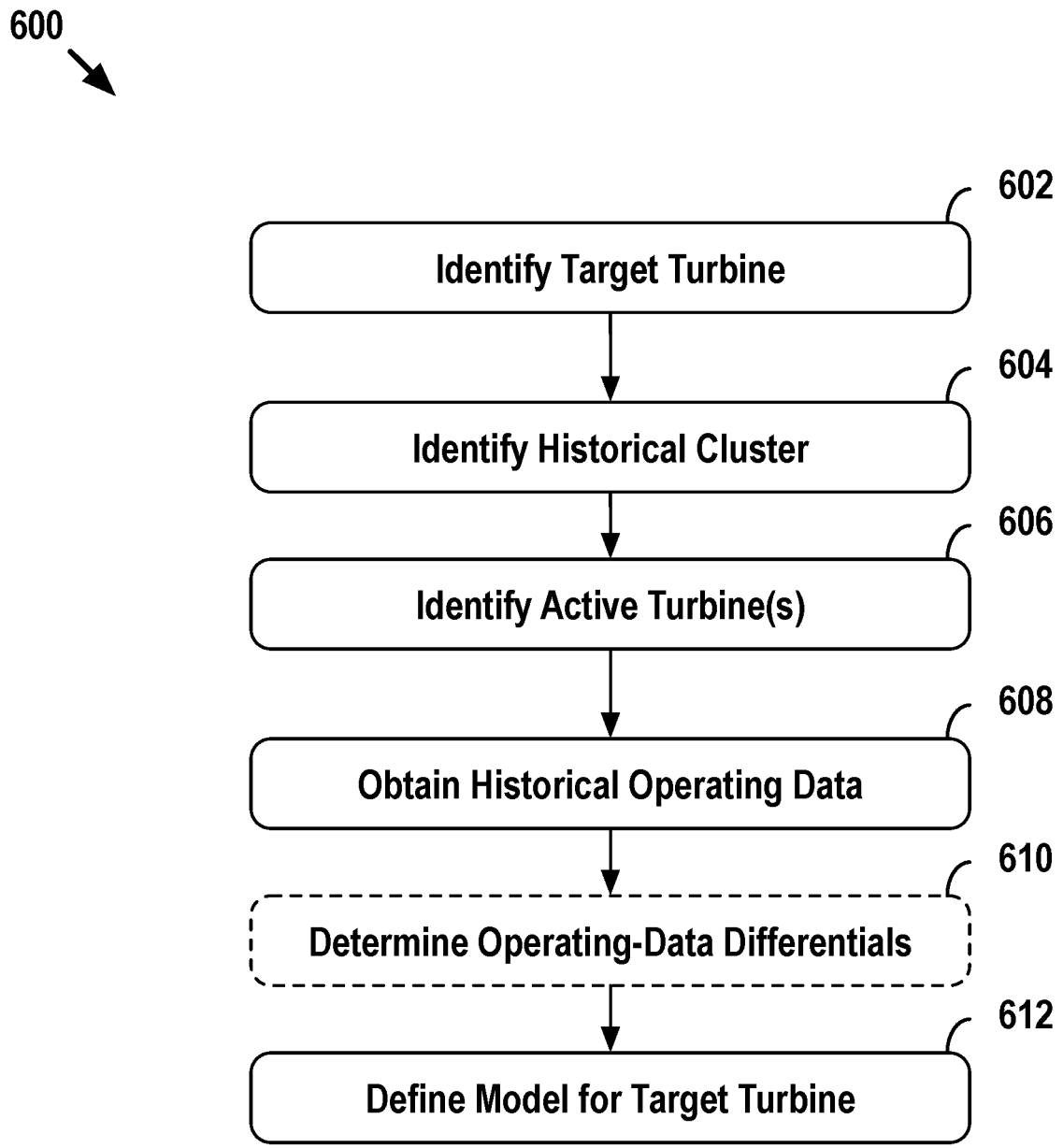
FIG. 6 is a flow diagram of example functions associated with a training phase.

FIG. 6 is a flow chart of example functions 600 associated with defining turbine-specific predictive models in accordance with example embodiments. For the purposes of explanation, the example training phase is described as being carried out by the data-analytics platform, but it could be performed by systems other than the platform or which work in conjunction with the platform. One of ordinary skill in the art will appreciate that the flow diagram 600 is provided for sake of clarity and illustration. Numerous other combinations of operations may be utilized in defining a model including, but not limited to, a training phase being performed offline with or without human intervention.

In practice, the data-analytics platform may define a turbine-specific predictive model for each wind turbine within a particular wind site and may do so for multiple wind sites. Each predictive model may generally represent a relationship between (1) operating data for a particular wind turbine as it relates to operating data for wind turbines that experience similar environmental conditions and (2) a likelihood that the particular wind turbine is either presently experiencing an abnormal event (e.g., an anomaly) or will experience an abnormal event within a certain amount of time in the future (e.g., a failure).

Generally, an abnormal event is indicative of a problem at the particular wind turbine. For example, the particular wind turbine as a whole or a subsystem thereof may experience a failure at a specific point in time. As another example, the particular wind turbine may experience one or more abnormal operating conditions for a threshold period of time that ultimately rises to the level of an indication of anomalous operation. For instance, a given sensor of the particular wind turbine may output, for several minutes, a signal value that is outside of a normal operating range, which may be treated as an anomaly. Thus, an abnormal event indicating a problem at the particular wind turbine may reflect an undesirable operation at a discrete point in time or for a discrete period of time, among other possibilities.

Briefly, at block 602, a particular wind turbine (i.e., the "target turbine") for which the predictive model is being defined may be identified as well as a timeframe of interest. At block 604, a historical, time-varying wind-turbine cluster that the target turbine was a member of during the timeframe of interest is identified. At block 606, one or more wind turbines from the time-varying cluster that were active during the timeframe of interest are then identified. At block 608, for each of the active cluster members, historical operating data is obtained as well as for the target turbine. At block 610, operating-data differentials are optionally determined based on the historical operating data for the target turbine and for the active cluster members. Lastly, at block 612, a predictive model for the target turbine is defined that is related to the operation of that turbine.

Turning now to the details of the example functions of FIG. 6, at block 602, the data-analytics platform may begin by identifying a particular wind turbine for which the predictive model is being defined, which may be referred to herein as the "target turbine." In example embodiments, this operation may involve the data-analytics platform receiving data indicative of a selection or identification of the target turbine, which may originate from a client station. In other embodiments, the data-analytics platform may identify the target turbine as part of a process for defining models for some or all of the turbines that are members of a wind site for which the data-analytics platform provides services. Other possibilities also exist.

Also at block 602, the data-analytics platform may identify a period of time in the past from which historical wind-turbine attribute data is analyzed to define the predictive model (i.e., a "timeframe of interest"). In example embodiments, this operation may involve the data-analytics platform receiving from a client station or the like data indicative of the timeframe of interest (e.g., a selection of start and stop dates and/or times). Additionally or alternatively, the data-analytics platform may be configured to utilize a "default" period of time in the past, such as two weeks prior to when the data-analytics platform is presently defining the predictive model. In some cases, a default period of time may be utilized if the data-analytics platform does not receive data indicative of a desired period of time in the past from a client station or the like.

In any event, the timeframe of interest includes an amount of time (e.g., hours, days, weeks, etc.) defined by the start and end of the timeframe. Depending on the nature of the predictive model that is being defined, that amount of time may also be used as the amount of time in the future for which the predictive model makes its prediction.

At block 604, the data-analytics platform may identify a historical wind-turbine "cluster" that the target turbine was a member of during the timeframe of interest. As discussed before, a cluster represents a set of wind turbines that are experiencing at least one similar environmental condition at a given point in time in a substantially similar manner. In some instances, multiple and/or specific environmental conditions that are experienced by wind turbines, such as wind direction and/or speed, are used to define a cluster and its members.

As mentioned before, the wind turbines of a wind site are generally distributed across a geographical area that experiences one or more environmental conditions in different manners across that area, and in fact, the environmental conditions of a given portion of that geographical area typically varies over time as well. Thus, at a first point in time, a group of wind turbines may be experiencing environmental conditions in a similar manner and may therefore be deemed a cluster. Then, at some later point in time, the environmental conditions may change such that the group of similarly situated turbines may change to include more or less wind turbines (or may even disappear altogether), which may result in the cluster having different members.

Figure 7:
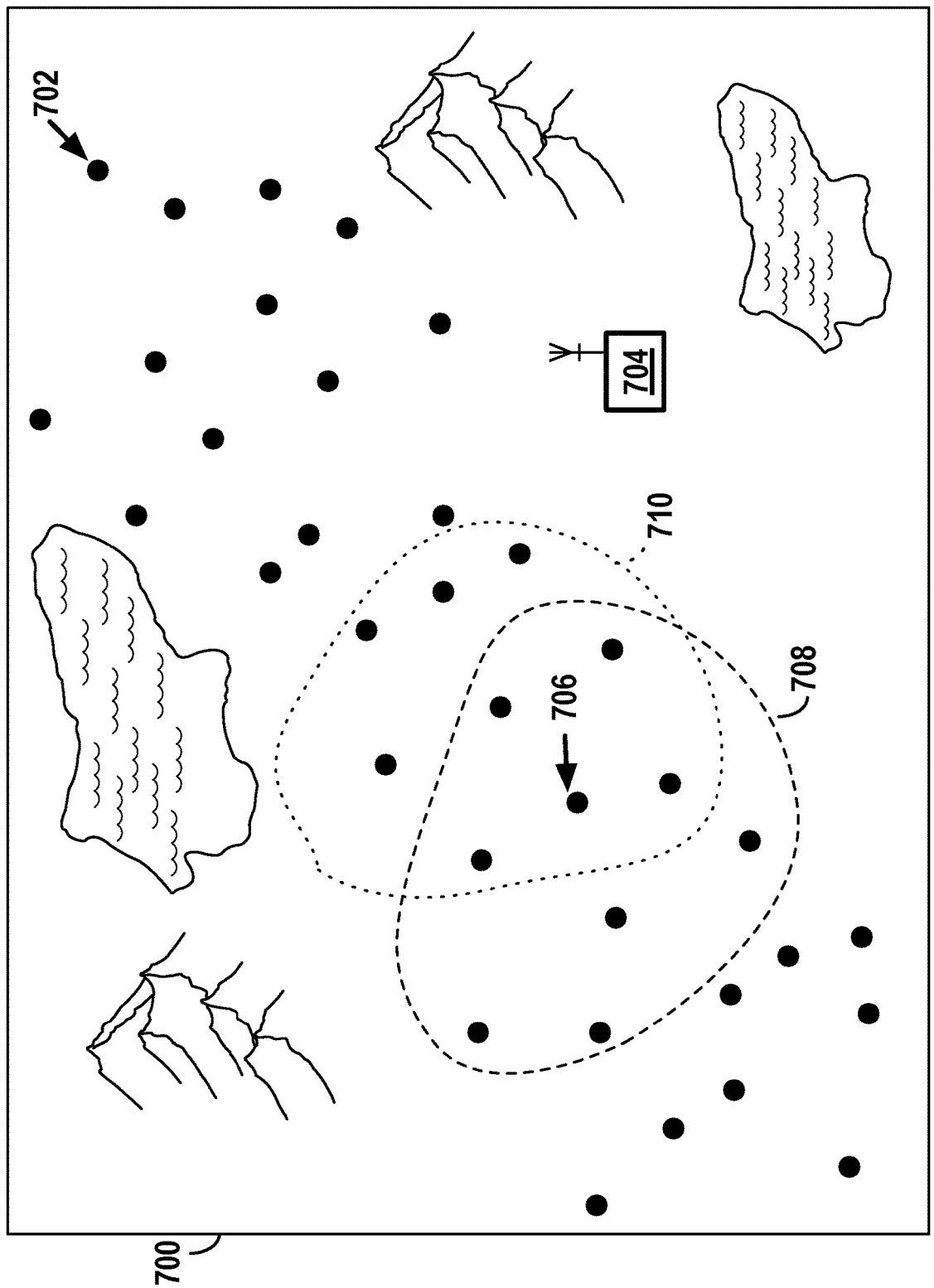
FIG. 7 is a conceptual illustration of a wind site at different points in time.

FIG. 7 is a conceptual illustration of an example wind site 700 and an example cluster at different points in time. As shown, the wind site 700 includes numerous wind turbines 702 and a control center 704. Wind turbine 706 corresponds to the target turbine identified at block 602 for which the predictive model is being defined.

At a first point in time, the target turbine 706's cluster included member turbines encircled by the dashed line 708. For instance, all of the members of that cluster may have experienced substantially the same humidity, wind pattern, and wind speed at the first point in time. At a second point in time, the target turbine 706's cluster included member turbines encircled by the dotted line 710. As shown, the target turbine's cluster at the second point in time represented by the dashed line 710 includes some members that were not part of the cluster at the first point in time represented by the dotted line 708 and excludes some members that were part of the cluster at the first point in time. This may indicate that, at the second point in time, any one or more of the humidity, wind pattern, or wind speed changed relative to that environmental condition at the first point in time. In the present example, the first and second points in time fall within the timeframe of interest identified at block 602 and therefore, the clusters 708 and 710 may be helpful in defining the predictive model for the target turbine.

Because the data-analytics platform is viewing cluster membership over a period of time rather than at a discrete point in time, in many cases the members of the target turbine's cluster are time-varying due to the dynamic nature of environmental conditions. The data-analytics platform may identify the clusters that the target turbine was a member of during the timeframe of interest in a variety of manners.

In example embodiments, this operation may be based at least on historical environmental data that provides a measure of some or all environmental conditions experienced by the target turbine during the timeframe of interest, as well as the same such data for other turbines from the wind site. More specifically, the data-analytics platform may first identify historical environmental data of at least one measured environmental condition that the target turbine experienced at each of various different times (e.g., various points in time and/or periods of time) during the timeframe of interest. For sake of simplicity, the following discusses a single measured environmental condition (e.g., wind speed), but it should be understood that, in practice, multiple environmental conditions are typically analyzed to facilitate identifying clusters.

The data-analytics platform may then identify the same historical environmental data for some or all of the other wind turbines that make up the wind site. For instance, the data-analytics platform may identify for all of the other wind turbines wind-speed data that was measured during the timeframe of interest. Thereafter, the data-analytics platform may compare the target turbine's measurements for each environmental condition of interest to the other wind turbine's measurements over the timeframe of interest. In example embodiments, this comparison may involve the data-analytics platform comparing measurements at specific, discrete points in time within the timeframe of interest (which might be defined based on a certain sampling rate or the like) or comparing measurements over specific periods of time within the timeframe of interest, which might involve the data-analytics platform determining and comparing average values of each turbine's measurements for each specific period of time.

In one possible implementation, this comparison may involve the data-analytics platform determining whether the difference between the wind turbines' respective measurements for each environmental condition of interest falls below a corresponding threshold. For example, the data-analytics platform may calculate a wind-speed difference between the target turbine's and the other turbine's respective wind speed measurements at each of various different times during the timeframe of interest and then determine whether the absolute value of that speed difference falls below a speed threshold. As another example, the data-analytics platform may calculate a directional difference (e.g., in degrees clockwise from due north) between the respective wind directions measured by wind turbines at each of various different times during the timeframe of interest and then determine whether the absolute value of that directional difference falls below a directional threshold. Many other examples are possible as well.

Additionally or alternatively, in other implementations, the data-analytics system may take the wind turbines' respective measurements for a plurality of different environmental conditions at each of various different times during the timeframe of interest and input them into a process that determines and outputs a "similarity score" between the wind turbines' respective measurements. As one possible example, such a process may calculate the difference between the wind turbines' respective measurements for each of a plurality of different environmental conditions and then analyze this set of differences collectively to determine the level of similarity between wind turbines' respective measurements. Other examples are possible as well.

Thereafter, the data-analytics platform may then identify one or more wind turbines that experienced one or more environmental conditions (e.g., wind speed) in a substantially similar manner as the target turbine experienced. In example embodiments, wind turbines are deemed to have experienced substantially similar environmental conditions when their respective, corresponding measured environmental data is the same or within a threshold differential at the same point in time. For example, the data-analytics platform may identify a wind turbine as part of the target turbine's cluster if, at any point in time during the timeframe of interest, that wind turbine and the target turbine experienced sufficiently similar wind speeds. Accordingly, a cluster and members thereof may vary over the timeframe of interest.

Moreover, in some example embodiments, the data-analytics platform may identify the target turbine's time-varying cluster during the timeframe of interest based further on location data of the target turbine and other turbines that are from the wind site. For example, after identifying the target turbine at block 602, the data-analytics platform may determine the GPS coordinates of the target turbine, which may involve accessing a database that maintains such data, querying an external data source (e.g., the data source 110), or querying the control center of the target turbine's wind site, among other possibilities.

Based on the target turbine's location, the data-analytics platform may then identify one or more other turbines that are likely experiencing environmental conditions in a similar manner as the target turbine based on proximity to the target turbine. For instance, the data-analytics platform may identify any turbines that are within a threshold distance from the target turbine's location based on GPS coordinates for the other turbines at the wind site. Thereafter, the data-analytics platform may then analyze historical environmental data for the turbines that are proximate to the target turbine to identify the cluster members, in line with the above discussion.

Returning to FIG. 6, at block 606, the data-analytics platform may identify any cluster members that were "active" during the timeframe of interest. More specifically, the data-analytics platform may identify any turbines that were "active" at the points in time when they were considered to be members of the target turbine's cluster (i.e., at "membership times"). The active cluster members from the timeframe of interest may be collectively viewed as a single, aggregated turbine (i.e., a "virtual turbine") that varies over time. That is, the virtual turbine may be representative of the time-varying cluster members from the timeframe of interest. In some cases the target turbine is considered part of the virtual turbine, while in other cases the target turbine is not part of the virtual turbine.

Generally, a wind turbine is considered to be "active" when it is functioning at a normal operational state (i.e., as expected). For example, when a wind turbine is generating an expected amount of electricity, that wind turbine may be considered to be "active." On the other hand, when a wind turbine is, for instance, inoperable (e.g., under repair or deactivated for some other reason) or operable but generating an unexpected amount of electricity, that wind turbine may not be considered to be "active" but rather "inactive." It should be understood that any given turbine might change between being "active" or "inactive" and vice versa during the timeframe of interest.

Identifying active members might be useful because not all cluster members are necessarily at a normal operational state. For example, even though a turbine might be experiencing the same environmental conditions as the target turbine, it may nonetheless be inoperable or operating unexpectedly. For instance, the meteorological unit of a wind turbine from an identified cluster may generate meteorological data that is ultimately provided to the data-analytics platform but that wind turbine might nonetheless not be operational because, for example, it might be under repair or deactivated due to certain other environmental conditions making it unsafe for that wind turbine to operate.

Accordingly, the data-analytics platform may identify active cluster members in order to define a baseline for normal operation of a wind turbine that is a member of the target-turbine's time-varying cluster. The virtual turbine may represent this baseline of normal operation.

In any event, the data-analytics platform may identify active cluster members in a number of manners. For instance, the data-analytics platform may perform this operation based on any one or more of a binary filter or a variable filter, among other possibilities. In some cases, the data-analytics platform may additionally or alternatively receive a message (e.g., an event code in an alphanumeric, numeric, alphabetic, etc. form) that may be generated by the control unit of a wind turbine indicating that the wind turbine went inactive at a specific point in time.

In example embodiments, the data-analytics platform may apply a binary filter that determines whether a wind turbine was operable or inoperable at a given point in time (e.g., at each membership time), which may be based on historical wind-turbine related data. Examples of this data may include historical electricity-production data and/or wind-turbine maintenance data, among other examples. In particular, electricity-production data may indicate that certain turbines were generating electricity at certain times, from which the data-analytics platform might infer that those certain turbines were active. On the other hand, electricity-production data may indicate that turbines were not generating electricity at certain times, from which the data-analytics platform might infer that those turbines were not active. Similarly, wind-turbine maintenance data may indicate that certain wind turbines were under repair at certain times, from which the data-analytics platform might infer that those turbines were not active. The data-analytics platform may apply other types of binary filters and/or base the filter on other data as well.

Additionally or alternatively, the data-analytics platform may apply a variable filter that determines whether a wind turbine was operating as expected or unexpectedly, as opposed to merely operating versus not operating. In example embodiments, applying a variable filter may involve an observed power-curve that may be defined by the data-analytics platform. Typically, each manufacturer of wind turbines offers a theoretical power-curve for the manufacturer's wind turbines that indicates how much electricity that manufacturer's wind turbines should produce as a function of wind speed.

Figure 8:
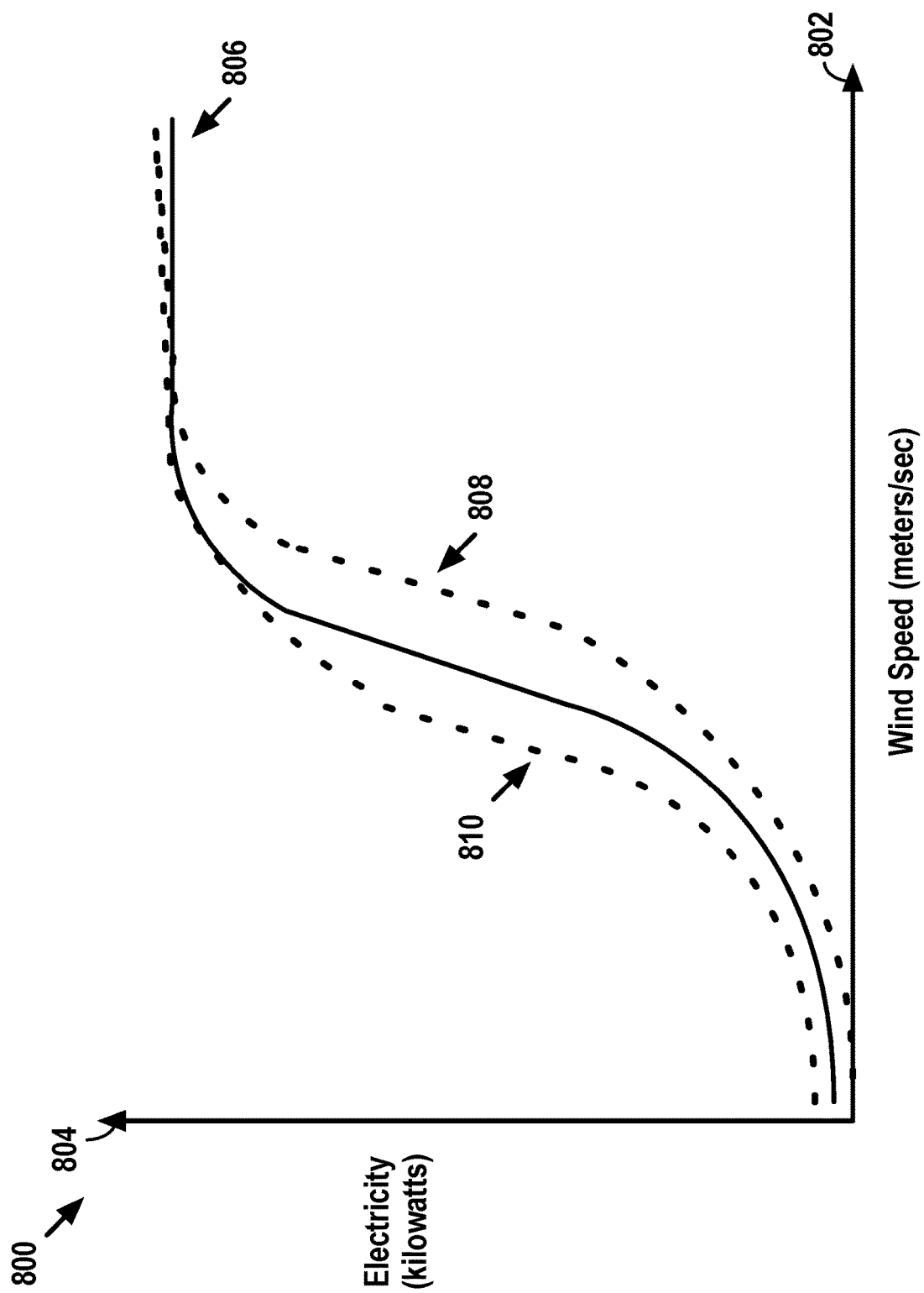
FIG. 8 is an example illustration of a theoretical power-curve and an observed power-curve.

FIG. 8 illustrates an example power-curve plot 800 that includes a theoretical power-curve as well as an observed power-curve. In particular, the plot 800 includes an x-axis 802 that represents wind speeds and a y-axis 804 that represents an amount of electricity produced. The plot 800 also includes a theoretical power-curve 806 (the solid line) that may have been determined by a particular manufacturer that represents how much electricity the particular manufacturer's wind turbines are expected to produce as the wind turbines experience different wind speeds.

As shown, the plot 800 further includes an observed power-curve that is defined by power-curve boundaries 808 and 810. Unlike the theoretical power-curve 806, the observed power-curve represents an expected range of generated electricity as a function of wind speed. In example embodiments, the data-analytics platform may have determined the observed power-curve based on historical electricity-production data and corresponding environmental data taking the form of wind speed data for a plurality of wind turbines made by the same manufacturer (e.g., the plurality of wind turbines at a given wind site). In some example embodiments, the data-analytics platform may determine an observed power-curve based on such data for wind turbines from different manufacturers that operate similarly. Other examples are also possible.

Returning to the data-analytics platform identifying active cluster members, applying a variable filter may be based on (i) an observed power-curve and (ii) historical electricity-production data and (iii) corresponding environmental data, including at least wind speed data, for each of the cluster members. More specifically, the data-analytics platform may first identify an observed power-curve based on, for example, the manufacturer of the cluster members. Then, the data-analytics platform may obtain, for each cluster member, historical electricity-production data and corresponding historical wind-speed data from around the given cluster member's membership time or times. Thereafter, the data-analytics platform may then determine whether that turbine's electricity production at that wind speed falls within the boundaries of the observed power-curve. That is, returning to FIG. 8, whether the electricity-production data at the particular wind speed is between the power-curve boundaries 808 and 810.

If so, the data-analytics platform may infer that that turbine was operating as expected and designate it as an active cluster member. Otherwise, the data-analytics platform may infer that that turbine was operating unexpectedly and designate it as an inactive cluster member. Once the data-analytics platform has determined all of the active cluster members, it then can use those turbines as a baseline for normal turbine operation. Any cluster members that were designated as inactive would no longer be used to define the target turbine's predictive model.

Returning to FIG. 6, at block 608, for each of the turbines that qualify as active cluster members, the data-analytics platform may obtain historical operating data for at least the times at which those turbines were cluster members. For example, the data-analytics platform may obtain historical operating data for each active cluster member for a certain amount of time (or a certain amount of data) around each membership time (e.g., before and/or after the membership time) that the given turbine was active and a member of a cluster that the target turbine was also a member of. Alternatively, in example embodiments, the data-analytics platform may obtain historical operating data for each of the active cluster members for the whole timeframe of interest. In any event, this operation may involve accessing one or more databases that store historical operating data.

In example embodiments, for each active cluster member as well as the target turbine, the data-analytics platform may obtain historical operating data that takes the form of sensor signal data for some or all sensors of the given wind turbine. In some cases, the data-analytics platform may obtain signal data from the same sensors for each active cluster member, including the target turbine. That is, the data-analytics platform may obtain matching operating data for the target turbine and active cluster members. Additionally or alternatively, the data-analytics platform may obtain signal data from sensors that are configured to measure the same or similar operating conditions. That is, the data-analytics platform may obtain non-matching operating data for the target turbine and active cluster members. Other examples are also possible.

Figure 9:
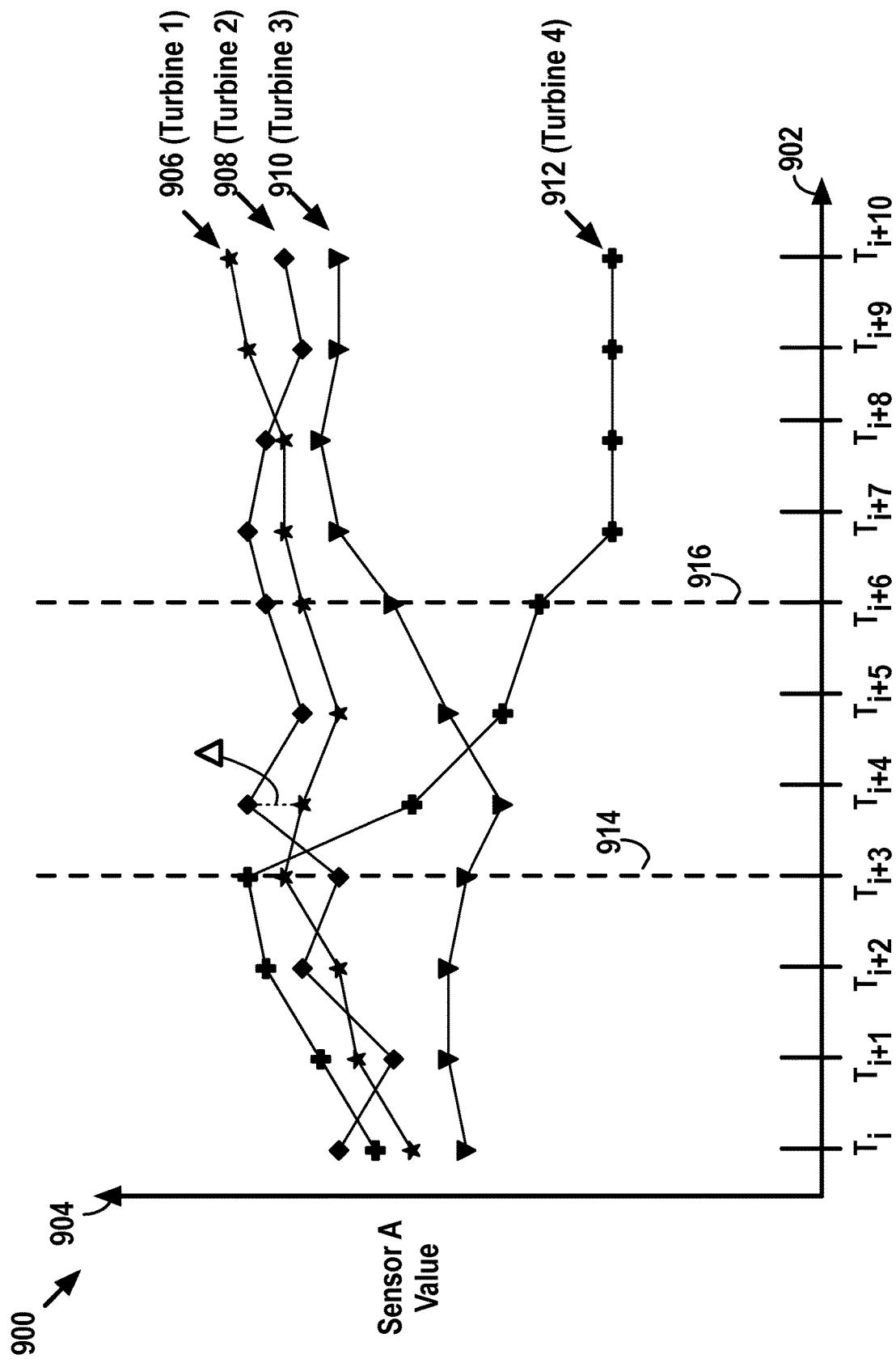
FIG. 9 is a conceptual illustration of operating data used to help define a predictive model.

FIG. 9 provides a conceptual illustration of historical operating data obtained by the data-analytics platform for the target turbine and example active cluster members identified at block 606. For sake of simplicity, plot 900 only shows sensor signal data from one sensor (e.g., "Sensor A") for each of the turbines, which in this example may represent a sensor configured to measure a bearing temperature of each turbine's respective rotor. However, this illustrated example should not be construed as limiting and in fact, in practice, the data-analytics platform typically analyzes operating data that is multivariate in nature that originates from a set of sensors that each serve to monitor a respective variable during a given turbine's operations and output a time-sequence of signal data for the monitored variable.

As shown in FIG. 9, the plot 900 includes an x-axis 902 that represents a window of time ($T_i$ through $T_{i-10}$) corresponding to the timeframe of interest identified at block 602 of FIG. 6 and a y-axis 904 that represents a signal value measured by Sensor A of four wind turbines that were cluster members at some point in time during the timeframe of interest. More specifically, the plot 900 includes signal measurements 906 (identified by the star icons "★") for the target turbine ("Turbine 1") and signal measurements for three other turbines that were members of the target turbine's cluster during the timeframe of interest: signal measurements 908 (identified by the diamond symbol "♦") corresponding to "Turbine 2"; signal measurements 910 (identified by the inverted triangle symbol "▼") corresponding to "Turbine 3"; and signal measurements 912 (identified by the plus symbol "✚") corresponding to "Turbine 4."

In this example, the target turbine (i.e., "Turbine 1") was a member of a cluster whose membership changed multiple times during the timeframe of interest: from time $T_i$ through $T_{i+3}$ (e.g., up to time-indicator 914), the cluster included Turbines 1, 2, and 4; from time $T_{i+4}$ through $T_{i+6}$ (e.g., between time-indicators 914 and 916), the cluster included Turbines 1 and 2; and from time $T_{i+7}$ through $T_{i+10}$ (e.g., after time-indicator 916), the cluster included Turbines 1, 2, and 3.

In this particular example, as shown, the data-analytics platform obtained historical operating data for each turbine over the whole timeframe of interest, regardless of the timing during which each particular turbine was a member of the target turbine's cluster. In other example embodiments, the data-analytics platform may only obtain historical operating data for each particular turbine's membership times. For instance, the data-analytics platform may only obtain historical operating data for Turbine 4 from time $T_i$ through $T_{i+3}$, while the data-analytics platform may only obtain historical operating data for Turbine 3 from time $T_{i+7}$ through $T_{i+10}$. Other examples are also possible.

Returning back to FIG. 6, at block 610, the data-analytics platform may optionally determine operating-data differentials based on the historical operating data for the target turbine and active cluster members. Whether the functions of block 610 are performed may depend on the nature of the predictive model that is being defined. In example embodiments that involve block 610, operating-data differentials that are determined at block 610 may be utilized as "training data," and perhaps also certain portions of the historical operating data. In example embodiments, the data-analytics platform may determine the operating-data differentials data in a variety of manners.

In one example embodiment, the data-analytics platform may perform this operation by comparing the historical operating data of the target turbine over the timeframe of interest with the same type of historical operating data of each other turbine that was identified to be an active, cluster member and then determining the difference between such data. For example, returning to the example illustrated in FIG. 9, the data-analytics platform might take the difference between Sensor A signal values for each active cluster member against corresponding Sensor A signal values for the target turbine (e.g., Turbine 1's Sensor A signal values compared to Turbine 2's and 4's Sensor A signal values measured at times $T_i$ through $T_{i+3}$; Turbine 1's Sensor A signal values compared to Turbine 2's Sensor A signal values measured at times $T_{i+4}$ through $T_{i+6}$; and Turbine 1's Sensor A signal values compared to Turbine 2's and 3's Sensor A signal values measured at times $T_{i+7}$ through $T_{i+10}$). From that comparison, the data-analytics platform may then determine operating-data differentials for the target turbine's operating data relative to each active cluster member's operating data. An illustrative example of an operating-data differential is shown in the plot 900 between Turbine 1's and Turbine 2's signal data at point in time $T_{i+4}$ (identified by the delta symbol "Δ"). Thus, in this example embodiment, the data-analytics platform determines multiple sets of operating-data differentials for Sensor A over the timeframe of interest.

In other example embodiments, instead of determining operating-data differentials relative to each active cluster member's operating data, the data-analytics platform may determine representative historical operating data for the time-varying "virtual turbine" of the target turbine's time-varying cluster and then determine operating-data differentials between the historical operating data of the target turbine and the representative historical operating data for this virtual turbine over the timeframe of interest. The data-analytics platform may determine the representative historical operating data for the time-varying virtual turbine of the target turbine's time-varying cluster in a variety of manners.

In example embodiments, the data-analytics platform may determine the virtual turbine's operating data based on one or more calculations to the operating data of the time-varying active cluster members. For instance, the data-analytics platform may determine one or more of average, maximum, minimum, median, etc. operating-data values for the active cluster members over the timeframe of interest. Based on that determination, the data-analytics platform may then define the virtual turbine's operating data. In example embodiments that do not involve block 610, the data-analytics platform might still determine operating data for the virtual turbine as part of or after block 608.

As an illustrative example, returning to FIG. 9, the data-analytics platform may determine operating data for the virtual turbine by calculating an average signal value for each point in time $T_i$ through $T_{i+10}$ based on the signal measurements for the active cluster members. More specifically, for times $T_i$ through $T_{i+3}$, the data-analytics platform might determine the average values of Turbine 2's and 4's Sensor A signal values; for times $T_{i+4}$ through $T_{i+6}$, the data-analytics platform might use the values of Turbine 2's Sensor A signal values (i.e., no average is determined because Turbine 2 is the only other cluster member in that period of time); and for times $T_{i+7}$ through $T_{i+10}$, the data-analytics platform might take the average values of Turbine 2's and 3's Sensor A signal values.

After the data-analytics platform determines operating data for the virtual turbine, it may then compare the virtual turbine's representative historical operating data to the target turbine's historical operating data at various times over the timeframe of interest to determine a single set of operating-data differentials for each of those times. Returning to the example illustrated in FIG. 9, the data-analytics platform may compare the averaged Sensor A signal values to the corresponding Sensor A signal values of Turbine 1 to determine a single set of sensor-value differentials over the timeframe of interest (e.g., times $T_i$ through $T_{i+10}$) for Sensor A. As mentioned before, in practice, the data-analytics platform may analyze operating data for a plurality of sensors of each turbine and so, the single set of operating-data differentials may include a differential for each sensor of the plurality of sensors at various times over the timeframe of interest. Thus, the single set of operating-data may take the form of a time-sequence of matrices, where each matrix represents operating-data differentials for the plurality of sensors at a given point in time. Other example manners for determining operating-data differentials are also possible.

Depending on the nature of the predictive model that is being defined, the determined operating-data differentials may be used, perhaps as well as some historical operating data, as training data for the predictive model. In some example embodiments that do not involve block 610, the historical operating data from block 608 may alone be used as training data for the predictive model. In some such embodiments, operating-data differentials may not be used and so the process may proceed directly from block 608 to block 612.

In any event, at block 612, the data-analytics platform may then define a predictive model related to the operation of the target turbine based at least on the training data that was determined before. In general, the predictive model for the target turbine may take a variety of forms, but it may generally represent a relationship between (1) operating data for the target wind turbine as it relates to operating data for wind turbines that experience similar environmental conditions and (2) a likelihood that the target wind turbine is either presently experiencing an abnormal event (e.g., an operational anomaly) or will experience an abnormal event within a certain amount of time in the future (e.g., a turbine-wide or subsystem failure). In this way, the data-analytics platform may define a predictive model for the target turbine based at least on historical operating data of the target turbine and past-active cluster members from the timeframe of interest.

The data-analytics platform may define the predictive model in a variety of manners. For example, various modeling techniques may be used to carry out this function, examples of which may include machine-learning techniques, supervised and unsupervised, such as random decision forests, logistic regression, k-means clustering, k-nearest neighbor (KNN) classification, DBSCAN clustering, artificial neural networks, and support vector machines, etc. (as well as combinations of two or more of these techniques). In example embodiments, the data-analytics platform may apply one or more of these machine-learning techniques to the training data that was determined at blocks 608 and/or 610.

In one particular example embodiment, the data-analytics platform may apply a supervised machine-learning technique to the training data to define a failure model for identifying the likelihood that the target turbine will experience a failure within a certain amount of time in the future. In general, the data-analytics platform defining such a failure model may involve (i) analyzing the training data to define a relationship between (a) the target turbine's operating data and active cluster member's operating data that reflects normal operation of a turbine situated in the cluster identified at block 604 and (b) a likelihood that the target turbine will experience a failure within a certain amount of time in the future and then (ii) embodying that relationship into a model for identifying the likelihood that the target turbine will experience a failure within the certain amount of time in the future.

The failure model may (i) take as inputs (a) operating data for the target turbine and active cluster members and/or (b) operating-data differentials based on operating data for the target turbine and active cluster members and (ii) provide an output indicating a likelihood that the target turbine will experience a failure within a certain amount of time in the future. In example embodiments, the output may take the form of a value between 0 and 1 that indicates how likely it is that the target turbine will experience such a failure, among other possibilities. In this regard, a higher value may indicate that the target turbine is more likely to experience a failure, while a lower value may indicate that the wind turbine is less likely to experience a failure. Details regarding exemplary processes for defining failure models can be found in U.S. patent application Ser. No. 14/732,258, which is herein incorporated by reference in its entirety.

In another particular example embodiment, the data-analytics platform may apply an unsupervised machine-learning technique to the training data to define an anomaly detection model for identifying whether the target turbine is experiencing an operational anomaly. In example embodiments, an anomaly detection model may take the form of a coordinate-transformation algorithm and corresponding set of threshold values for a transformed coordinate space. The set of threshold values may be utilized to modify run-time operating data for the target turbine in the transformed coordinate space to facilitate detecting an anomalous behavior at the target turbine. In practice, an anomaly detection model may be defined in a variety of manners.

For instance, in example embodiments, the data-analytics platform may begin by utilizing the historical operating data of the active cluster members from block 608 that reflects normal turbine operation (e.g., without anomalous operation). That is, in this example implementation, the data-analytics platform may use the historical operating data of the active cluster members as training data.

Then, the data-analytics platform may transform the training data from an original coordinate space to a transformed coordinate space having fewer dimensions than the original coordinate space. The data-analytics platform may next standardize the transformed training data in the transformed coordinate space.

Thereafter, for each variable (i.e., monitored turbine operating condition) in the transformed coordinate space, the data-analytics platform may analyze the distribution of standardized training data values for that variable to determine a maximum expected value (i.e., a threshold value) of the variable in the transformed coordinate space (e.g., based on the standard deviation of the standardized training data values for that variable). In so doing, the data-analytics platform defines a set of threshold values that effectively define the boundary of a multi-dimensional enclosed shape (e.g., a circle, ellipsoid, etc.) centered around the origin of the transformed coordinate space. In example embodiments, this set of threshold values may comprise a respective threshold value for each selected variable in the transformed coordinate space, where each variable's threshold value represents a maximum expected value of the variable during normal virtual-turbine operation.

The data-analytics platform then stores the set of threshold values for future comparison to run-time data in the transformed coordinate space. These values and the algorithm discussed above may then represent an anomaly detection model. Further details regarding exemplary processes for defining anomaly detection models can be found in U.S. patent application Ser. No. 15/367,012, which is herein incorporated by reference in its entirety.

In some embodiments, the model generated by the data-analytics platform may be validated based on wind-turbine attribute data before the model is used in the run-time phase. The platform may have test operating data associated with a known instance of the target turbine operating abnormally. The test operating data may be input into the model and the model may output a likelihood of the particular wind turbine experiencing an abnormal condition, which may then be used to verify that the output by the model is correct.

B. Example Run-Time Phase

An example run-time phase may involve executing a predictive model for a particular turbine based at least on recent operating data for the particular turbine and for a plurality of active turbines. Depending on the nature of the particular predictive model, the run-time phase may result in the data-analytics platform determining a likelihood that the particular wind turbine is either presently experiencing an abnormal event (e.g., an anomaly) or will experience an abnormal event within a certain amount of time in the future (e.g., a failure).

Figure 10:
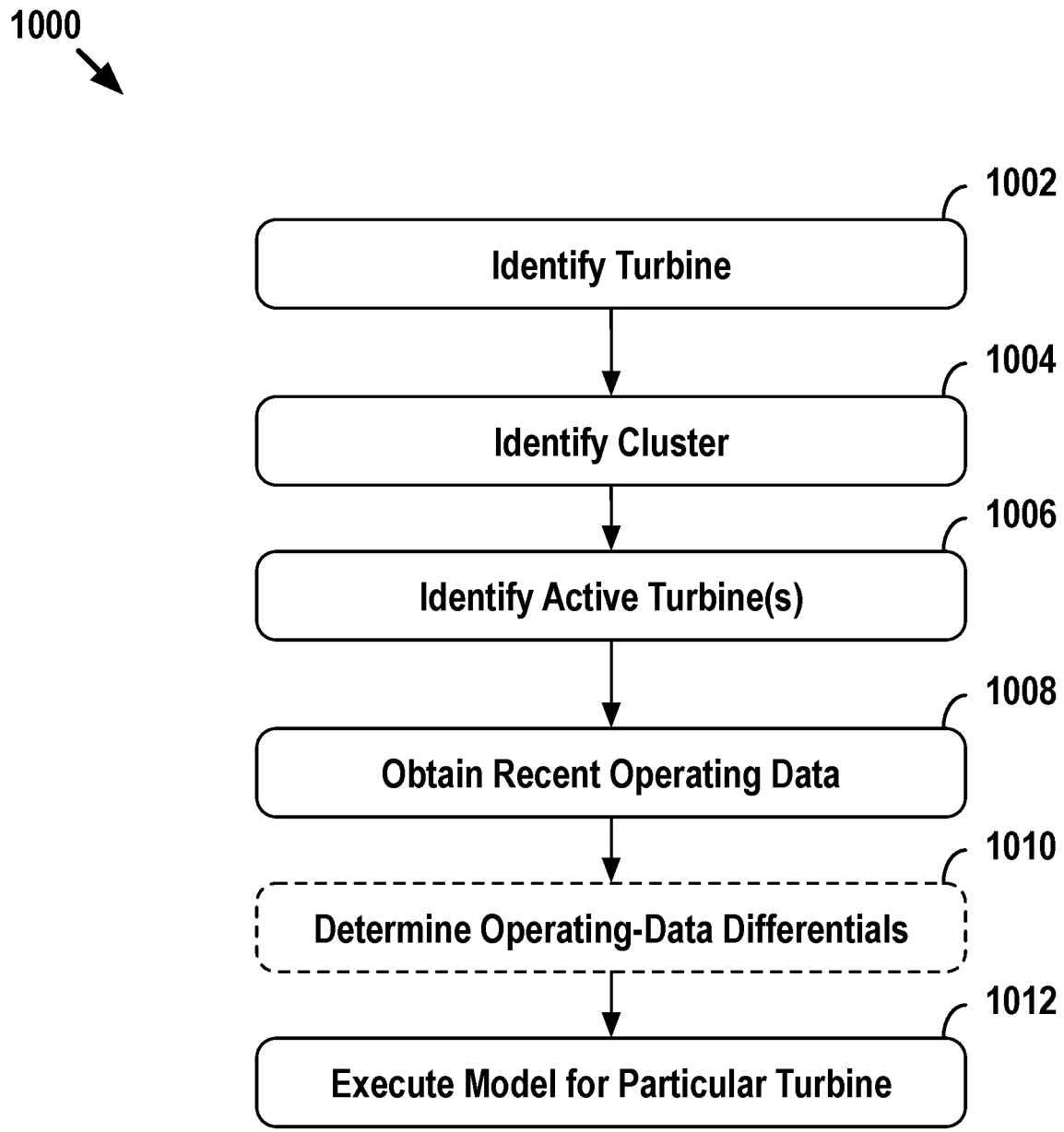
FIG. 10 is a flow diagram of example functions associated with a run-time phase.

FIG. 10 is a flow diagram 1000 of example functions associated with an example run-time phase. For the purpose of explanation, the example run-time phase is described as being carried out by a data-analytics platform, such as the data platform 102 of FIG. 1, but it could be performed by systems other than the platform or which work in conjunction with the platform. One of ordinary skill in the art will appreciate that the flow diagram 1000 is provided for sake of clarity and illustration. Numerous other combinations of operations may be utilized in executing predictive models.

At a high level, at block 1002, a particular wind turbine is identified (i.e., the target turbine). At block 1004, the cluster in which the target turbine is presently a member of is identified. At block 1006, the active turbines of the identified cluster are then identified. At block 1008, recent operating data is obtained for each of the active cluster members as well as the target turbine. At block 1010, operating-data differentials are optionally determined based on corresponding recent operating data for the particular wind turbine and for the active cluster members. Lastly, at block 1012, the predictive model for the particular wind turbine is executed.

Discussing now the details of the functions of FIG. 10, at block 1002, the data-analytics platform may identify a particular wind turbine to run analytics for (i.e., the target turbine). In example embodiments, this operation may involve the data-analytics platform receiving data indicative of a selection or identification of the target turbine, which may originate from a client station. In other embodiments, the data-analytics platform may identify the target turbine as part of an automatic process of running analytics for some or all of the turbines that are members of a wind site for which the data-analytics platform provides services. Other possibilities also exist.

In any event, once the data-analytics platform identifies the target turbine, it may then likewise identify a predictive model that was specifically defined for the target turbine. The data-analytics platform may do so based on a correlation table or the like, among other possibilities.

At block 1004, the data-analytics platform may identify the cluster in which the particular wind turbine is most recently a member of. The data-analytics platform may perform this operation in a variety of manners.

In example embodiments, the data-analytics platform may perform operations similar to those described with reference to block 604 of FIG. 6. For instance, the data-analytics platform may utilize environmental data providing a measure of recent environmental conditions that the target turbine was experiencing and perhaps also location data of the target turbine. In practice, "recent" data may be the most current data that is available (i.e., data within a reasonable amount of time prior to the data-analytics platform's analysis) but may not be "up-to-the-minute" data. In some example implementations, the data-analytics platform might infer that "recent" data is representative of "present/current" data.

In any event, the data-analytics platform may then use the target turbine's recent environmental data, and perhaps location data, to identify other wind turbines that were recently also experiencing one or more environmental conditions in a similar manner as the target turbine. Based on that identification, the data-analytics platform may then identify the target turbine's most recent cluster.

In example embodiments, the one or more environmental conditions used during the run-time phase may be the same as the one or more environmental conditions that were used at block 604 during the training phase. In other example embodiments, some of the one or more environmental conditions used during the run-time phase may differ from the one or more environmental conditions that were used at block 604 during the training phase.

At block 1006, the data-analytics platform may identify active turbines that are members of the cluster identified at block 1004. The data-analytics platform may perform this operation in a variety of manners.

In example embodiments, the data-analytics platform may perform operations similar to those described with reference to block 606 of FIG. 6 except that, instead of utilizing historical wind-turbine related data, the data-analytics platform may utilize at least some recent wind-turbine related data. For example, this operation may involve the data-analytics platform applying a binary and/or variable filter based on at least some recent wind-turbine related data.

In example embodiments that involve a binary filter, the data-analytics platform may utilize some wind-turbine attribute data from which it can infer whether cluster members are presently operational. Examples of this data may include recent electricity-production data and/or wind-turbine maintenance data. In particular, recent electricity-production data may indicate that certain turbines were recently generating electricity, from which the data-analytics platform might infer that those turbines are presently active. Likewise, wind-turbine maintenance data may indicate that certain wind turbines were presently not under repair (or that data may reflect that certain wind turbines are not scheduled to be under repair at the present time), from which the data-analytics platform might infer that those turbines are presently active. On the other hand, electricity-production data may indicate that certain turbines were not presently generating electricity and/or wind-turbine maintenance data may indicate that certain wind turbines were recently under repair (or that data may reflect that certain wind turbines are scheduled to be repaired at the present time), from which the data-analytics platform might infer that those turbines are presently inactive.

In example embodiments that involve a variable filter, the data-analytics platform may utilize some recent wind-turbine attribute data from which the data-analytics platform may infer whether cluster members are presently operating normally. In one particular example, the data-analytics platform may determine recently active cluster members based on an observed power-curve, recent electricity-production data and corresponding recent environmental data, including at least wind speed data, for each of the cluster members. The data-analytics platform may make such a determination in line with the above discussion with reference to block 606 of FIG. 6. That is, the data-analytics platform may determine whether any cluster member's recent electricity production at a recent wind speed falls within the boundaries of the observed power-curve. The data-analytics platform may identify active cluster members in other manners as well.

At block 1008, the data-analytics platform may obtain recent operating data for each of the active cluster members, as well as for the target turbine. In example embodiments, this operation may involve the data-analytics platform receiving or otherwise obtaining one or multiple streams of data that includes operating data for the target turbine and active cluster members. In some cases, the data-analytics platform may receive some of all of this data from a control center of the wind site (e.g., the control center 208 of FIG. 2), the wind turbines themselves, and/or an external data source (e.g., the data source 110 of FIG. 1), among other possible operating data sources. In some implementations, the data-analytics platform may receive the one or more streams of data in real-time or near real-time.

At block 1010, the data-analytics platform may optionally determine operating-data differentials based on the recent operating data for the target turbine and active cluster members. As with block 610 of FIG. 6, whether the functions of block 1010 are performed may depend on the nature of the predictive model that is being executed. In example embodiments, the data-analytics platform may perform this operation in line with the above discussion with respect to block 610 of FIG. 6.

Similar to the above discussion, depending on the nature of the predictive model that is being executed, the determined recent operating-data differentials may be used as run-time data for the predictive model. In some example embodiments that do not involve block 1010, the operating data from block 1008 may be used as run-time data for the predictive model. In such embodiments, operating-data differentials may not be used and so the process may proceed directly from block 1008 to block 1012.

At block 1012, the data-analytics platform may then execute the predictive model for the target turbine based on the run-time data from above. In general, executing the predictive model may involve utilizing recent-operating data and/or differentials for the target turbine and active cluster members as input data for the predictive model that then outputs a likelihood that the target turbine is either presently experiencing an abnormal event, such as an operational anomaly, or will experience an abnormal event, such as a turbine-wide or subsystem failure, within a certain amount of time in the future. The data-analytics platform may execute the predictive model in a variety of manners, which may depend on the nature of the predictive model.

In an example embodiment that involves a failure model, the data-analytics platform may execute the failure model based on recent-operating data (e.g., sensor signal data) for the target turbine and active cluster members (or sensor-signal differentials based on that recent-operating data) to identify a likelihood that the target turbine will experience a failure within a certain amount of time in the future. Details regarding exemplary processes for executing failure models can be found in U.S. patent application Ser. No. 14/732,258, which is herein incorporated by reference in its entirety.

In example embodiments that involve an anomaly detection model, the data-analytics platform may execute the anomaly detection model based on recent-operating data (e.g., sensor signal data) for the target turbine and active cluster members to identify a likelihood that the target turbine is experiencing an operational anomaly.

As one particular example, executing an anomaly detection model may involve the data-analytics platform receiving multivariate data (e.g., sensor signals for multiple sensors of each relevant wind turbine) from one or more turbine-related data sources in an original coordinate space having a number of dimensions equal to the number of variables included in the data.

The data-analytics platform may then transform (or "project") the data from the original coordinate space to a transformed coordinate space having fewer dimensions than the original coordinate space. Next, the data-analytics platform may standardize the transformed data in the transformed coordinate space in a manner similar to that discussed above with reference to block 612 of FIG. 6.

The data-analytics platform may thereafter compare the standardized data with the set of threshold values that were defined at block 612 and may modify the standardized data in the transformed coordinate space based on the comparison between the standardized data and the set of threshold values.

The data-analytics platform may next inversely transform (or project) the modified data from the transformed coordinate space back to the original coordinate space. The data-analytics platform may then analyze the post-transformation data in the original coordinate space to identify anomalies that suggest that the target turbine is experiencing an anomalous operating condition. For example, the asset data platform 102 may apply anomaly detection tests to analyze how the post-transformation data (e.g., inversely transformed modified data) compares to the pre-transformation data (e.g., received sensor signal data) in the original coordinate space over a predefined period of time, in order to identify instances when one or more variables in the data appear to be anomalous (e.g., instances when statistically-significant discrepancies exist in at least one variable value between the post-transformation and pre-transformation data).

Furthermore, the data-analytics platform may utilize diagnostic and/or prognostic methods that analyze received operating data, transformed data, and anomaly detection test results to determine whether the anomalous behavior is indicative of equipment failure. Such diagnostic and prognostic methods include, but are not limited to, time series extrapolation, expert rules, and machine learning techniques. Additional details regarding exemplary processes for executing anomaly detection models can be found in U.S. patent application Ser. No. 15/367,012, which is herein incorporated by reference in its entirety.

The data-analytics platform may use the output data from executing the predictive model in a variety of ways. In one embodiment, the data-analytics platform may cause an action at one or more output systems, such as a client station 112 from FIG. 1, via a network communication over the communication network 104. For example, the data-analytics platform may cause a graphical user interface to display a representation of the likelihood that the target turbine is presently experiencing an abnormal event or will experience an abnormal event within a certain amount of time in the future, which may take the form of text, graphics, and/or color indicative of the likelihood.

In another embodiment, the data-analytics platform may cause an action at the target turbine. In particular, depending on the output of the executed predictive model, the data-analytics platform may send a control signal directed to the target turbine that causes the turbine to change its operational state. For example, if the output of the executed predictive model indicates a relatively high likelihood that the target turbine is presently experiencing or will soon experience an abnormal event at the target turbine's rotor, then the data-analytics platform may then send a control signal that causes the wind turbine's positioning system to modify the wind turbine's direction and/or the pitch of its blades to, for instance, decrease the speed at which the rotor is rotating. In another example, the data-analytics platform may cause the target turbine to go inactive all together. In this way, the data-analytics platform may utilize the output of the executed predictive model to proactively modify the operational state of the target turbine, which may prevent a long-term or otherwise more severe failure at the target turbine.

In yet another example, if the output of the executed predictive model indicates a relatively low likelihood that the target turbine is presently experiencing or will soon experience an abnormal event, then the data-analytics platform may send a control signal that causes the wind-turbine's positioning system to modify the wind turbine's direction and/or the pitch of its blades to, for instance, increase the speed at which the rotor is rotating, thereby generating more electricity. In this way, the data-analytics platform may utilize the output of the executed predictive model to optimize the electricity generation and long-term health of the target turbine.

In example embodiments, the data-analytics platform may directly or indirectly cause the action at the target turbine. For instance, the data-analytics platform may send a control signal directly to the control unit of the target turbine (or perhaps a local analytics device installed on the target turbine), or it may send a control signal to the control center of the wind site where the target turbine is located at and the control center may in turn send a signal to the target turbine to effectuate the desired control. Other possibilities also exist.

VI. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided may not be the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

To the extent that examples described herein involve operations performed or initiated by actors, such as "humans", "operators", "users" or other entities, this is for purposes of example and explanation only. Moreover, the claims should not be construed as requiring action by such actors unless explicitly recited in the claim language.

The invention claimed is:

1. A non-transitory computer-readable medium having program instructions stored thereon that are executable to cause a computing system to perform functions comprising:
defining a predictive model that is (i) specific to one given wind turbine of a plurality of wind turbines and (ii) configured to output predictions related to the operation of the one given wind turbine based on an evaluation of how operating data for the one given wind turbine relates to operating data for one or more other active members of a time-varying wind-turbine cluster specific to the one given wind turbine, wherein defining the predictive model comprises:
evaluating which of the plurality of wind turbines were active members of a time-varying wind-turbine cluster specific to the one given wind turbine during a period of time in the past, wherein active membership of the time-varying wind-turbine cluster specific to the one given wind turbine was changing during the period of time in the past;
based on the evaluating, identifying a first subset of the plurality of wind turbines that were active members of the time-varying wind-turbine cluster specific to the one given wind turbine at some point during the period of time in the past, wherein the first subset of the plurality of wind turbines comprises any wind turbine of the plurality of wind turbines that was, during at least a portion of the period of time in the past, both (i) experiencing comparable environmental conditions to the one given wind turbine and (ii) active; and
based at least on (i) historical operating data for each of the first subset of the plurality of wind turbines and (ii) historical operating data for the one given wind turbine, defining the predictive model; and
thereafter executing the defined predictive model that is (i) specific to the one given wind turbine and (ii) configured to output predictions related to the operation of the one given wind turbine based on an evaluation of how operating data for the one given wind turbine relates to operating data for one or more other active members of the time-varying wind-turbine cluster specific to the one given wind turbine, wherein executing the defined predictive model comprises:
evaluating which of the plurality of wind turbines were active members of the time-varying wind-turbine cluster specific to the one given wind turbine at a recent time;
based on the evaluating, identifying a second subset of the plurality of wind turbines that were active members of the time-varying wind-turbine cluster specific to the one given wind turbine at the recent time, wherein the second subset of the plurality of wind turbines comprises any wind turbine of the plurality of wind turbines that was, at the recent time, both (i) experiencing comparable environmental conditions to the one given wind turbine and (ii) active; and
applying the defined predictive model to at least (i) recent operating data for at least one of the second subset of the plurality of wind turbines and (ii) recent operating data for the one given wind turbine, and thereby outputting a prediction related to the operation of the one given wind turbine; and
causing a graphical user interface that is communicatively coupled to the computing system to display a representation of the output of the executed predictive model.

2. The non-transitory computer-readable medium of claim 1,
wherein evaluating which of the plurality of wind turbines were active members of the time-varying wind-turbine cluster specific to the one given wind turbine during the period of time in the past comprises evaluating which of the plurality of wind turbines were active members of the time-varying wind-turbine cluster specific to the one given wind turbine during the period of time in the past based at least on historical environmental data of the plurality of wind turbines from the period of time in the past, and
wherein evaluating which of the plurality of wind turbines were active members of the time-varying wind-turbine cluster specific to the one given wind turbine at the recent time comprises evaluating which of the plurality of wind turbines were active members of the time-varying wind-turbine cluster specific to the one given wind turbine at the recent time based at least on recent environmental data of the plurality of wind turbines.

3. The non-transitory computer-readable medium of claim 2,
wherein the historical environmental data indicates a measure of one or more historical environmental conditions that the plurality of wind turbines experienced during the period of time in the past, and
wherein the recent environmental data indicates a measure of one or more environmental conditions that the plurality of wind turbines recently experienced.

4. The non-transitory computer-readable medium of claim 2, wherein evaluating which of the plurality of wind turbines were active members of the time-varying wind-turbine cluster specific to the one given wind turbine during the period of time in the past comprises evaluating which of the plurality of wind turbines were active members of the time-varying wind-turbine cluster specific to the one given wind turbine during the period of time in the past based additionally on one or both of historical maintenance data or historical electricity-production data for the plurality of wind turbines.

5. The non-transitory computer-readable medium of claim 2, wherein evaluating which of the plurality of wind turbines were active members of the time-varying wind-turbine cluster specific to the one given wind turbine during the period of time in the past comprises evaluating which of the plurality of wind turbines were active members of the time-varying wind-turbine cluster specific to the one given wind turbine during the period of time in the past based additionally on observed power-curve data and one or both of historical electricity-production data or historical environmental data corresponding to the historical electricity-production data for the plurality of wind turbines.

6. The non-transitory computer-readable medium of claim 2, wherein evaluating which of the plurality of wind turbines were active members of the time-varying wind-turbine cluster specific to the one given wind turbine at the recent time comprises evaluating which of the plurality of wind turbines were active members of the time-varying wind-turbine cluster specific to the one given wind turbine at the recent time based additionally on one or both of maintenance data or recent electricity-production data for the plurality of wind turbines.

7. The non-transitory computer-readable medium of claim 2, wherein evaluating which of the plurality of wind turbines were active members of the time-varying wind-turbine cluster specific to the one given wind turbine at the recent time comprises evaluating which of the plurality of wind turbines were active members of the time-varying wind-turbine cluster specific to the one given wind turbine at the recent time based additionally on observed power-curve data and one or both of recent electricity-production data or recent environmental data corresponding to the recent electricity-production data for the plurality of wind turbines.

8. The non-transitory computer-readable medium of claim 1, wherein the predictive model comprises a failure model, and wherein the prediction output by the predictive model comprises a likelihood that the one given wind turbine will experience a failure within a certain amount of time in the future.

9. The non-transitory computer-readable medium of claim 1, wherein the predictive model comprises an anomaly detection model, and wherein the prediction output by the predictive model comprises an indication of whether the one given wind turbine is experiencing an anomalous operating condition.

10. The non-transitory computer-readable medium of claim 1, wherein applying the predictive model to at least (i) the recent operating data for at least one of the second subset of the plurality of wind turbines and (ii) the recent operating data for the one given wind turbine comprises:
    determining one or more operating-data differentials based at least on (i) the recent operating data for at least one of the second subset of the plurality of wind turbines and (ii) the recent operating data for the one given wind turbine; and
    applying the predictive model to at least the one or more operating-data differentials.

11. The non-transitory computer-readable medium of claim 1, wherein the program instructions are further executable to cause the computing system to:
    after executing the predictive model, and in response to the prediction output by the predictive model, cause the one given wind turbine to change an operational state of the one given wind turbine.

12. A computing system configured to perform data analytics for a plurality of wind turbines, the computing system comprising:
    a network interface configured to facilitate communications over a communication network with one or more wind-turbine data sources;
    at least one processor;
    a non-transitory computer-readable medium; and
    program instructions stored on the non-transitory computer-readable medium that are executable by the at least one processor to cause the computing system to:
        define a predictive model that is (i) specific to one given wind turbine of the plurality of wind turbines and (ii) configured to output predictions related to the operation of the one given wind turbine based on an evaluation of how operating data for the one given wind turbine relates to operating data for one or more other active members of a time-varying wind-turbine cluster specific to the one given wind turbine, wherein defining the predictive model comprises:
            evaluating which of the plurality of wind turbines were active members of a time-varying wind-turbine cluster specific to the one given wind turbine during a period of time in the past, wherein active membership of the time-varying wind-turbine cluster specific to the one given wind turbine was changing during the period of time in the past;
            based on the evaluating, identifying a first subset of the plurality of wind turbines that were active members of the time-varying wind-turbine cluster specific to the one given wind turbine at some point during the period of time in the past, wherein the first subset of the plurality of wind turbines comprises any wind turbine of the plurality of wind turbines that was, during at least a portion of the period of time in the past, both (i) experiencing comparable environmental conditions to the one given wind turbine and (ii) active; and
            based at least on (i) historical operating data for each of the first subset of the plurality of wind turbines and (ii) historical operating data for the one given wind turbine, defining the predictive model; and
        thereafter execute the defined predictive model that is (i) specific to the one given wind turbine and (ii) configured to output predictions related to the operation of the one given wind turbine based on an evaluation of how operating data for the one given wind turbine relates to operating data for one or more other active members of the time-varying wind-turbine cluster specific to the one given wind turbine, wherein executing the defined predictive model comprises:
            evaluating which of the plurality of wind turbines were active members of the time-varying wind-turbine cluster specific to the one given wind turbine at a recent time;
            based on the evaluating, identifying a second subset of the plurality of wind turbines that were active members of the time-varying wind-turbine cluster specific to the one given wind turbine at the recent time, wherein the second subset of the plurality of wind turbines comprises any wind turbine of the plurality of wind turbines that was, at the recent time, both (i) experiencing comparable environmental conditions to the one given wind turbine and (ii) active; and
            applying the defined predictive model to at least (i) recent operating data for at least one of the second subset of the plurality of wind turbines and (ii) recent operating data for the one given wind turbine, and thereby outputting a prediction related to the operation of the one given wind turbine; and
        cause a graphical user interface that is communicatively coupled to the computing system to display a representation of the output of the executed predictive model.

13. The computing system of claim 12, wherein the predictive model comprises a failure model, and wherein the prediction output by the predictive model comprises a likelihood that the one given wind turbine will experience a failure within a certain amount of time in the future.

14. The computing system of claim 12, wherein the predictive model comprises an anomaly detection model, and wherein the prediction output by the predictive model comprises an indication of whether the one given wind turbine is experiencing an anomalous operating condition.

15. The computing system of claim 12, wherein the program instructions are further executable to cause the computing system to:
- after executing the predictive model, and in response to the prediction output by the predictive model, cause the one given wind turbine to change an operational state of the one given wind turbine.

16. A method performed by a computing system configured to perform data analytics for a plurality of wind turbines, the method comprising:
- defining a predictive model that is (i) specific to one given wind turbine of the plurality of wind turbines and (ii) configured to output predictions related to the operation of the one given wind turbine based on an evaluation of how operating data for the one given wind turbine relates to operating data for one or more other active members of a time-varying wind-turbine cluster specific to the one given wind turbine, wherein defining the predictive model comprises:
  - evaluating which of the plurality of wind turbines were active members of a time-varying wind-turbine cluster specific to the one given wind turbine during a period of time in the past, wherein active membership of the time-varying wind-turbine cluster specific to the one given wind turbine was changing during the period of time in the past;
  - based on the evaluating, identifying a first subset of the plurality of wind turbines that were active members of the time-varying wind-turbine cluster specific to the one given wind turbine at some point during the period of time in the past, wherein the first subset of the plurality of wind turbines comprises any wind turbine of the plurality of wind turbines that was, during at least a portion of the period of time in the past, both (i) experiencing comparable environmental conditions to the one given wind turbine and (ii) active; and
  - based at least on (i) historical operating data for each of the first subset of the plurality of wind turbines and (ii) historical operating data for the one given wind turbine, defining the predictive model; and
- thereafter executing the defined predictive model that is (i) specific to the one given wind turbine and (ii) configured to output predictions related to the operation of the one given wind turbine based on an evaluation of how operating data for the one given wind turbine relates to operating data for one or more other active members of the time-varying wind-turbine cluster specific to the one given wind turbine, wherein executing the defined predictive model comprises:
  - evaluating which of the plurality of wind turbines were active members of the time-varying wind-turbine cluster specific to the one given wind turbine at a recent time;
  - based on the evaluating, identifying a second subset of the plurality of wind turbines that were active members of the time-varying wind-turbine cluster specific to the one given wind turbine at the recent time, wherein the second subset of the plurality of wind turbines comprises any wind turbine of the plurality of wind turbines that was, at the recent time, both (i) experiencing comparable environmental conditions to the one given wind turbine and (ii) active; and
  - applying the defined predictive model to at least (i) recent operating data for at least one of the second subset of the plurality of wind turbines and (ii) recent operating data for the one given wind turbine, and thereby outputting a prediction related to the operation of the one given wind turbine; and
- causing a graphical user interface that is communicatively coupled to the computing system to display a representation of the output of the executed predictive model.

\* \* \* \* \*